US012743735B2

(12) United States Patent
Mohseni et al.

(10) Patent No.: US 12,743,735 B2
(45) Date of Patent: Sep. 22, 2026

(54) SYSTEMS AND METHODS FOR DISTRIBUTING NETWORK APPLICATION DATA ACCORDING TO MACHINE-LEARNING OUTPUT

(71) Applicant: DK Crown Holdings Inc., Boston, MA (US)

(72) Inventors: Robin Mohseni, Billericay (GB); Gengyuan Zhang, Boston, MA (US); Nolan Shulman, Toronto (CA)

(73) Assignee: DK Crown Holdings Inc., Boston, MA (US)

( * ) Notice: Subject to any disclaimer, the term of this patent is extended or adjusted under 35 U.S.C. 154(b) by 0 days.

(21) Appl. No.: 19/358,916

(22) Filed: Oct. 15, 2025

(65) Prior Publication Data

US 2026/0111194 A1 Apr. 23, 2026

Related U.S. Application Data

(60) Provisional application No. 63/741,671, filed on Jan. 3, 2025, provisional application No. 63/741,297, filed (Continued)

(51) Int. Cl.
*G06Q 50/34* (2012.01)
*G06F 8/38* (2018.01)

(Continued)

(52) U.S. Cl.
CPC .............. *G06Q 50/34* (2013.01); *G06F 8/38* (2013.01); *G06F 16/22* (2019.01);

(Continued)

(58) Field of Classification Search
CPC .............................. G06F 8/38; G06F 16/3329
See application file for complete search history.

(56) References Cited

U.S. PATENT DOCUMENTS

| | | | |
|---|---|---|---|
| 9,558,620 | B2 | 1/2017 | Froy et al. |
| 10,311,670 | B2 | 6/2019 | Brahmandam et al. |

(Continued)

FOREIGN PATENT DOCUMENTS

| | | | |
|---|---|---|---|
| CN | 116310582 A | | 6/2023 |
| WO | WO-2023/064563 A1 | | 4/2023 |

(Continued)

OTHER PUBLICATIONS

Structure guided prompt: Instructing LLM (Year: 2024).*

(Continued)

*Primary Examiner* — Cao H Nguyen
(74) *Attorney, Agent, or Firm* — Foley & Lardner LLP

(57) ABSTRACT

Described herein are systems and methods for providing machine-learning system functionalities. A system can receive, from an application executing on a client device during a communication session, a prompt for a language model comprising a request for information corresponding to the application. Using the prompt, the system can identify an identifier of a first application interface of a plurality of application interfaces of the application to satisfy the request for information. The system can generate, using the language model, the prompt, and the identifier, output comprising a data structure corresponding to formatting of a graphical element that, when interacted with, causes navigation to the first application interface. The system can provide the output to the client device in response to the request, causing the client device to parse the data structure and generate the graphical element for display in a graphical user interface.

18 Claims, 13 Drawing Sheets

Related U.S. Application Data on Jan. 2, 2025, provisional application No. 63/719,406, filed on Nov. 12, 2024, provisional application No. 63/711,415, filed on Oct. 24, 2024, provisional application No. 63/708,554, filed on Oct. 17, 2024, provisional application No. 63/708,504, filed on Oct. 17, 2024, provisional application No. 63/708,509, filed on Oct. 17, 2024, provisional application No. 63/708,492, filed on Oct. 17, 2024, provisional application No. 63/708,528, filed on Oct. 17, 2024, provisional application No. 63/708,542, filed on Oct. 17, 2024.

(51) Int. Cl.

| | |
|---|---|
| ***G06F 16/22*** | (2019.01) |
| ***G06F 16/23*** | (2019.01) |
| ***G06F 16/3329*** | (2025.01) |
| ***G06F 16/338*** | (2019.01) |
| ***G06F 16/35*** | (2025.01) |
| ***G06F 16/9535*** | (2019.01) |
| ***G06F 18/214*** | (2023.01) |
| ***G06F 40/279*** | (2020.01) |
| ***G06F 40/289*** | (2020.01) |
| ***G06F 40/295*** | (2020.01) |
| ***G06F 40/30*** | (2020.01) |
| ***G06F 40/40*** | (2020.01) |
| ***G06N 3/0895*** | (2023.01) |
| ***G06N 20/00*** | (2019.01) |
| ***G07F 17/32*** | (2006.01) |
| ***H04L 51/02*** | (2022.01) |
| ***H04L 67/141*** | (2022.01) |
| ***H04L 67/306*** | (2022.01) |
| *G06F 40/284* | (2020.01) |
| *G06F 40/35* | (2020.01) |

(52) U.S. Cl.

CPC ...... *G06F 16/2237* (2019.01); *G06F 16/2379* (2019.01); *G06F 16/3329* (2019.01); *G06F 16/33295* (2025.01); *G06F 16/338* (2019.01); *G06F 16/35* (2019.01); *G06F 16/9535* (2019.01); *G06F 18/214* (2023.01); *G06F 40/279* (2020.01); *G06F 40/289* (2020.01); *G06F 40/295* (2020.01); *G06F 40/30* (2020.01); *G06N 3/0895* (2023.01); *G06N 20/00* (2019.01); *G07F 17/323* (2013.01); *G07F 17/3237* (2013.01); *G07F 17/3244* (2013.01); *G07F 17/3288* (2013.01); *H04L 51/02* (2013.01); *H04L 67/141* (2013.01); *H04L 67/306* (2013.01); *G06F 40/284* (2020.01); *G06F 40/35* (2020.01); *G06F 40/40* (2020.01)

(56) References Cited

U.S. PATENT DOCUMENTS

| | | | |
|---|---|---|---|
| 10,825,303 | B2 | 11/2020 | Mcdonald et al. |
| 10,950,086 | B2 | 3/2021 | Brahmandam et al. |
| 11,094,171 | B2 | 8/2021 | Huke et al. |
| 11,574,522 | B1 | 2/2023 | Mendell et al. |
| 11,622,156 | B1 | 4/2023 | Mendell et al. |
| 11,704,000 | B1 * | 7/2023 | McIvor ................... G06F 9/451 715/764 |
| 11,735,006 | B2 | 8/2023 | Nelson et al. |
| 11,756,379 | B2 | 9/2023 | Huke et al. |
| 11,763,637 | B2 | 9/2023 | Huke et al. |
| 11,776,362 | B2 | 10/2023 | Nelson et al. |
| 11,785,280 | B1 | 10/2023 | Dakss et al. |
| 12,008,862 | B2 | 6/2024 | Inamdar et al. |
| 12,067,039 | B1 | 8/2024 | Campos et al. |
| 12,067,849 | B2 | 8/2024 | Storm et al. |
| 12,079,449 | B2 | 9/2024 | Mcivor et al. |
| 12,118,320 | B2 | 10/2024 | Gelfenbeyn et al. |
| 12,128,288 | B1 | 10/2024 | Redman et al. |
| 12,190,683 | B2 | 1/2025 | Huke et al. |
| 12,307,861 | B1 | 5/2025 | Todisco et al. |
| 12,322,246 | B2 | 6/2025 | Turner |
| 12,361,796 | B2 | 7/2025 | Joao |
| 12,444,266 | B2 | 10/2025 | Joao |
| 12,457,239 | B1 | 10/2025 | Mantin et al. |
| 12,477,036 | B1 | 11/2025 | Tenbuuren et al. |
| 2002/0068633 | A1 | 6/2002 | Schlaifer |
| 2008/0311981 | A1 | 12/2008 | Schugar et al. |
| 2010/0121808 | A1 | 5/2010 | Kuhn |
| 2010/0328066 | A1 | 12/2010 | Walker et al. |
| 2012/0034974 | A1 | 2/2012 | Amaitis et al. |
| 2012/0310926 | A1 | 12/2012 | Gannu et al. |
| 2013/0274007 | A1 | 10/2013 | Hilbert et al. |
| 2014/0024435 | A1 | 1/2014 | Scott |
| 2014/0289236 | A1 | 9/2014 | Agarwal et al. |
| 2015/0038236 | A1 | 2/2015 | Robbins et al. |
| 2015/0339884 | A1 | 11/2015 | Chun |
| 2016/0086441 | A1 | 3/2016 | Cohen et al. |
| 2016/0155350 | A1 | 6/2016 | Dragicevic et al. |
| 2016/0189483 | A1 | 6/2016 | Ballman |
| 2016/0196723 | A1 | 7/2016 | Ballman |
| 2018/0068661 | A1 | 3/2018 | Printz |
| 2018/0204417 | A1 | 7/2018 | Triplett |
| 2018/0225911 | A1 | 8/2018 | Washington et al. |
| 2019/0012876 | A1 | 1/2019 | Brahmandam et al. |
| 2019/0122482 | A1 | 4/2019 | Amaitis et al. |
| 2019/0318582 | A1 | 10/2019 | Barak |
| 2019/0325028 | A1 | 10/2019 | Palanichamy et al. |
| 2019/0361966 | A1 | 11/2019 | Munro et al. |
| 2019/0362601 | A1 | 11/2019 | Kline et al. |
| 2019/0392684 | A1 | 12/2019 | Mcdonald et al. |
| 2020/0027314 | A1 | 1/2020 | Pilnock et al. |
| 2020/0118040 | A1 | 4/2020 | Dey et al. |
| 2020/0234543 | A1 | 7/2020 | Schwartz et al. |
| 2021/0049490 | A1 | 2/2021 | Hood |
| 2021/0118264 | A1 | 4/2021 | Nelson et al. |
| 2021/0217277 | A1 | 7/2021 | Huke et al. |
| 2021/0217278 | A1 | 7/2021 | Huke et al. |
| 2021/0233344 | A1 | 7/2021 | Amaitis et al. |
| 2021/0248707 | A1 | 8/2021 | Huke et al. |
| 2021/0248875 | A1 | 8/2021 | Huke et al. |
| 2021/0256650 | A1 | 8/2021 | Huke et al. |
| 2021/0272415 | A1 | 9/2021 | Huke et al. |
| 2021/0280006 | A1 | 9/2021 | Pace |
| 2021/0299882 | A1 | 9/2021 | Cupersmith et al. |
| 2021/0319666 | A1 | 10/2021 | Salivar et al. |
| 2021/0319668 | A1 | 10/2021 | Huke et al. |
| 2021/0342550 | A1 | 11/2021 | Palanichamy et al. |
| 2021/0343122 | A1 | 11/2021 | Warren |
| 2021/0375090 | A1 | 12/2021 | Huke et al. |
| 2021/0383645 | A1 | 12/2021 | Gupta et al. |
| 2022/0019950 | A1 | 1/2022 | Sabri |
| 2022/0122601 | A1 | 4/2022 | Cronin |
| 2022/0139160 | A1 | 5/2022 | Huke et al. |
| 2022/0148364 | A1 | 5/2022 | Huke et al. |
| 2022/0148365 | A1 | 5/2022 | Huke et al. |
| 2022/0157114 | A1 | 5/2022 | Huke et al. |
| 2022/0165118 | A1 | 5/2022 | Huke et al. |
| 2022/0165120 | A1 | 5/2022 | Huke et al. |
| 2022/0172560 | A1 | 6/2022 | Huke et al. |
| 2022/0188366 | A1 | 6/2022 | Song et al. |
| 2022/0188672 | A1 | 6/2022 | Basch et al. |
| 2022/0189238 | A1 | 6/2022 | Huke et al. |
| 2022/0270432 | A1 | 8/2022 | Mendell et al. |
| 2022/0351568 | A1 | 11/2022 | Smith |
| 2022/0358808 | A1 | 11/2022 | Huke et al. |
| 2022/0417603 | A1 | 12/2022 | Pleiman |
| 2023/0011114 | A1 | 1/2023 | Guy et al. |
| 2023/0082553 | A1 | 3/2023 | Mendell |
| 2023/0124722 | A1 | 4/2023 | Polson et al. |
| 2023/0162563 | A1 | 5/2023 | Turner |
| 2023/0185579 | A1 | 6/2023 | Eranpurwala et al. |
| 2023/0196871 | A1 | 6/2023 | Inamdar et al. |

(56) References Cited

U.S. PATENT DOCUMENTS

2023/0252848 A1 8/2023 Isgar
2023/0259714 A1* 8/2023 Lange .................. G06F 40/237 704/9
2023/0267805 A1 8/2023 Edsall
2023/0350928 A1 11/2023 Hill et al.
2023/0351845 A1 11/2023 Mendell et al.
2023/0360488 A1 11/2023 Alyekhin
2023/0360489 A1 11/2023 Alyekhin
2023/0360490 A1 11/2023 Alyekhin
2023/0360494 A1 11/2023 Alyekhin
2023/0394930 A1 12/2023 Shore et al.
2023/0410591 A1 12/2023 Monteverdi
2024/0029511 A1 1/2024 Teruuchi
2024/0086648 A1 3/2024 Han et al.
2024/0086773 A1 3/2024 Oppenheimer
2024/0105024 A1 3/2024 Huke et al.
2024/0282296 A1 8/2024 Bhathena et al.
2024/0290169 A1 8/2024 Inamdar et al.
2024/0312312 A1 9/2024 Flint
2024/0320510 A1 9/2024 Kundu et al.
2024/0346256 A1 10/2024 Qin
2024/0350924 A1 10/2024 Orlow
2024/0362409 A1 10/2024 Kuan
2024/0362968 A1 10/2024 Lyons et al.
2024/0362973 A1 10/2024 Owoyemi
2024/0367054 A1 11/2024 Nelson et al.
2024/0378251 A1 11/2024 Boyd
2024/0378940 A1 11/2024 Latifi et al.
2024/0403845 A1 12/2024 O'Hanlon et al.
2024/0412058 A1 12/2024 Mayande et al.
2024/0428700 A1 12/2024 Asgekar et al.
2025/0046150 A1 2/2025 Huke et al.
2025/0077913 A1* 3/2025 Vodeniktov ............. G06N 5/04
2025/0086190 A1 3/2025 Azarmi
2025/0094143 A1* 3/2025 Huang ..................... G06F 8/38
2025/0094708 A1 3/2025 Cunningham et al.
2025/0095438 A1 3/2025 Russ et al.
2025/0103624 A1 3/2025 Carta et al.
2025/0118151 A1 4/2025 Williams
2025/0118156 A1 4/2025 Jovanovic
2025/0124063 A1 4/2025 Isslieb et al.
2025/0124340 A1 4/2025 Ni et al.
2025/0140075 A1 5/2025 Groset et al.
2025/0157284 A1 5/2025 Wolfe et al.
2025/0161811 A1 5/2025 Assaad et al.
2025/0174083 A1 5/2025 Huke et al.
2025/0191437 A1 6/2025 Hanson et al.
2025/0191440 A1 6/2025 Bradley et al.
2025/0209891 A1 6/2025 Jacquet et al.
2025/0232126 A1 7/2025 Ma et al.
2025/0238449 A1 7/2025 Sharma et al.
2025/0265310 A1 8/2025 Barnes
2025/0278633 A1 9/2025 Smith et al.
2025/0291866 A1 9/2025 Park et al.
2025/0294091 A1 9/2025 Mukherjee et al.
2025/0299053 A1 9/2025 Cuomo et al.
2025/0299536 A1 9/2025 Chun et al.
2025/0307302 A1 10/2025 Kolugur et al.
2025/0307572 A1 10/2025 Shtar et al.
2025/0307639 A1 10/2025 Jin et al.
2025/0316134 A1 10/2025 Vaccaro
2025/0316139 A1 10/2025 Vaccaro
2025/0316145 A1 10/2025 Merati
2025/0322092 A1 10/2025 Troiani et al.
2025/0322168 A1 10/2025 Sharma
2025/0322295 A1 10/2025 Brin et al.
2025/0329218 A1 10/2025 Russ et al.
2025/0348580 A1 11/2025 Galinkin
2025/0355929 A1 11/2025 Lara Silva et al.
2025/0356725 A1 11/2025 Nowak
2025/0363856 A1 11/2025 Turner et al.
2025/0391250 A1 12/2025 Todisco et al.
2026/0024524 A1 1/2026 Perkins et al.

FOREIGN PATENT DOCUMENTS

WO WO-2023/140642 A1 7/2023
WO WO-2024/194418 A1 9/2024
WO WO-2025/019764 A1 1/2025
WO WO-2025/042386 A1 2/2025

OTHER PUBLICATIONS

Final Office Action on U.S. Appl. No. 19/357,856 dtd Apr. 21, 2026.
Final Office Action on U.S. Appl. No. 19/357,902 dtd Feb. 9, 2026.
Final Office Action on U.S. Appl. No. 19/358,919 dtd Apr. 21, 2026.
Final Office Action on U.S. Appl. No. 19/358,959 dtd Feb. 5, 2026.
Final Office Action on U.S. Appl. No. 19/359,438 dtd Apr. 2, 2026.
Final Office Action on U.S. Appl. No. 19/359,531 dtd Mar. 25, 2026.
Final Office Action on U.S. Appl. No. 19/360,328 dtd Feb. 26, 2026.
Final Office Action on U.S. Appl. No. 19/360,383 dtd Feb. 3, 2026.
Final Office Action on U.S. Appl. No. 19/360,512 dtd Apr. 22, 2026.
Lee, et al., "Sportify: Question Answering with Embedded Visualizations and Personified Narratives for Sports Video," in arXiv preprint arXiv:2408.05123 (2024). (Year: 2024).
Non-Final Office Action on U.S. Appl. No. 19/357,967 dtd Jan. 28, 2026.
Non-Final Office Action on U.S. Appl. No. 19/360,368 dtd Jan. 28, 2026.
Non-Final Office Action on U.S. Appl. No. 19/360,597 dtd Jan. 30, 2026.
Non-Final Office Action on U.S. Appl. No. 19/360,886 dtd Feb. 19, 2026.
Notice of Allowance on U.S. Appl. No. 19/359,534 dtd Feb. 11, 2026.
Notice of Allowance on U.S. Appl. No. 19/360,383 dtd Apr. 17, 2026.
Notice of Allowance on U.S. Appl. No. 19/360,405 dtd Apr. 24, 2026.
Non-Final Office Action on U.S. Appl. No. 19/360,307 dtd Jan. 20, 2026.
Notice of Allowance on U.S. Appl. No. 19/360,873 dtd Jan. 26, 2026.
Cureton, et al., "Federated learning for intent classification." In 2023 IEEE 19th International Conference on Intelligent Computer Communication and Processing (ICCP), pp. 315-322. IEEE, 2023. (Year: 2023).
Non-Final Office Action on U.S. Appl. No. 19/357,856 dtd Jan. 2, 2026.
Non-Final Office Action on U.S. Appl. No. 19/357,889 dtd Jan. 12, 2026.
Non-Final Office Action on U.S. Appl. No. 19/357,902 dtd Dec. 16, 2025.
Non-Final Office Action on U.S. Appl. No. 19/357,918 dtd Jan. 13, 2026.
Non-Final Office Action on U.S. Appl. No. 19/358,919 dtd Dec. 23, 2025.
Non-Final Office Action on U.S. Appl. No. 19/358,959 dtd Dec. 2, 2025.
Non-Final Office Action on U.S. Appl. No. 19/359,002 dtd Jan. 13, 2026.
Non-Final Office Action on U.S. Appl. No. 19/359,036 dtd Jan. 13, 2026.
Non-Final Office Action on U.S. Appl. No. 19/359,438 dtd Dec. 19, 2025.
Non-Final Office Action on U.S. Appl. No. 19/359,531 dtd Dec. 12, 2025.
Non-Final Office Action on U.S. Appl. No. 19/359,534 dtd Dec. 11, 2025.
Non-Final Office Action on U.S. Appl. No. 19/360,020 dtd Jan. 14, 2026.
Non-Final Office Action on U.S. Appl. No. 19/360,328 dtd Dec. 11, 2025.
Non-Final Office Action on U.S. Appl. No. 19/360,383 dtd Dec. 15, 2025.
Non-Final Office Action on U.S. Appl. No. 19/360,405 dtd Jan. 5, 2026.

(56) References Cited

OTHER PUBLICATIONS

Non-Final Office Action on U.S. Appl. No. 19/360,512 dtd Dec. 30, 2025.
Non-Final Office Action on U.S. Appl. No. 19/360,809 dtd Jan. 14, 2026.
Non-Final Office Action on U.S. Appl. No. 19/360,880 dtd Dec. 31, 2025.
Non-Final Office Action on U.S. Appl. No. 19/360,886 dtd Dec. 8, 2025.
Non-Final Office Action on U.S. Appl. No. 19/360,892 dtd Jan. 13, 2026.
Schick et al., "Toolformer: Language Models Can Teach Themselves to Use Tools", Feb. 9, 2023, arXiv.com, pp. 1-17 (Year: 2023).
Final Office Action on U.S. Appl. No. 19/357,889 DTD Apr. 29, 2026.
Final Office Action on U.S. Appl. No. 19/357,918 DTD Jul. 29, 2026.
Final Office Action on U.S. Appl. No. 19/360,597 DTD Jun. 5, 2026.
Final Office Action on U.S. Appl. No. 19/360,809 DTD May 1, 2026.
Final Office Action on U.S. Appl. No. 19/360,880 DTD Apr. 29, 2026.
Final Office Action on U.S. Appl. No. 19/360,892 DTD May 8, 2026.
Mohsenimofidi S, Prasad AS, Zahid A, Ra?q U, Wang X, Attal MI. Classifying user intent for effective prompt engineering: A case of a chatbot for startup teams. InGenerative AI for Effective Software Development Jun. 1, 2024 (pp. 317-329). Cham: Springer Nature Switzeriand. (Year: 2024).
Non-Final Office Action on U.S. Appl. No. 19/357,902 DTD Jul. 15, 2026.
Non-Final Office Action on U.S. Appl. No. 19/359,036 DTD May 11, 2026.
Non-Final Office Action on U.S. Appl. No. 19/359,948 DTD Jun. 17, 2026.
Non-Final Office Action on U.S. Appl. No. 19/360,030 DTD May 7, 2026.
Notice of Allowance on U.S. Appl. No. 19/358,959 DTD Jun. 26, 2026.
Notice of Allowance on U.S. Appl. No. 19/360,020 DTD Jun. 16, 2026.
Notice of Allowance on U.S. Appl. No. 19/360,307 DTD May 21, 2026.

* cited by examiner

SYSTEMS AND METHODS FOR DISTRIBUTING NETWORK APPLICATION DATA ACCORDING TO MACHINE-LEARNING OUTPUT

CROSS-REFERENCES TO RELATED APPLICATIONS

This application claims the benefit of and priority to U.S. Provisional Patent Application No. 63/741,297, filed Jan. 2, 2025; and claims the benefit of and priority to U.S. Provisional Patent Application No. 63/708,509, filed Oct. 17, 2024; and claims the benefit of and priority to U.S. Provisional Patent Application No. 63/708,492, filed Oct. 17, 2024; and claims the benefit of and priority to U.S. Provisional Patent Application No. 63/708,528, filed Oct. 17, 2024; and claims the benefit of and priority to U.S. Provisional Patent Application No. 63/708,542, filed Oct. 17, 2024; and claims the benefit of and priority to U.S. Provisional Patent Application No. 63/708,504, filed Oct. 17, 2024; and claims the benefit of and priority to U.S. Provisional Patent Application No. 63/711,415, filed Oct. 24, 2024; and claims the benefit of and priority to U.S. Provisional Patent Application No. 63/708,554, filed Oct. 17, 2024; and claims the benefit of and priority to U.S. Provisional Patent Application No. 63/719,406, filed Nov. 12, 2024; and claims the benefit of and priority to U.S. Provisional Patent Application No. 63/741,671, filed Jan. 3, 2025; the contents of each of which are incorporated herein by reference in their entireties for all purposes.

BACKGROUND

Network environments can support communication between multiple computing devices using techniques such as packet-switching. Data transmitted between devices can be synchronized such that multiple devices on the same network access the same information. However, it can be challenging to efficiently synchronize data transmission for graphical elements using conventional networking technology.

SUMMARY

At least one aspect of the present disclosure is directed to a system. The system can include one or more processors coupled to memory. The one or more processors may maintain a plurality of wager opportunities corresponding to a plurality of live events. Each of the plurality of wager opportunities can correspond to a wager type. The one or more processors may establish a communication session with a client device. The one or more processors may receive from the client device during the communication session, a prompt for a language model comprising a request. The one or more processors may determine a classification of the request included in the prompt. The one or more processors may generate an input context for the language model using the prompt and the classification. The one or more processors may generate, using the language model and the input context, output comprising a data structure corresponding to formatting of a graphical element for at least one wager recommendation selected based on the prompt. The one or more processors may provide the output to the client device in response to the request. The output can cause the client device to parse the data structure and generate the graphical element for display in a graphical user interface.

In some implementations, the data structure can include an indication of at least one live event of the plurality of live events. In some implementations, the client device can be associated with a player profile. The data structure can include instructions to generate an interactive element that, when interacted with, causes the client device to transmit a request to update the player profile based on the at least one wager recommendation. In some implementations, the one or more processors may generate the data structure to include an indication that the at least one wager recommendation corresponds to a parlay wager. In some implementations, the one or more processors may determine a number of wagers placed based on the at least one wager recommendation. In some implementations, the one or more processors may update the data structure to include an indication of the number of wagers placed.

In some implementations, the prompt can be a first prompt. In some implementations, the one or more processors may receive, from the client device, a second prompt indicating a request to update the at least one wager recommendation. In some implementations, the one or more processors may generate, using the language model, the second prompt, and the data structure, second output including a second data structure corresponding to formatting of a second graphical element for the at least one wager recommendation. In some implementations, the one or more processors may provide the second output to the client device, causing the client device to parse the second data structure and generate the second graphical element for display in the graphical user interface.

In some implementations, the one or more processors may receive, from the client device, in response to an interaction with the graphical element, a request to place a wager corresponding to the at least one wager recommendation. In some implementations, the one or more processors may update a player profile associated with the client device according to the wager. In some implementations, the prompt can be a first prompt, and the one or more processors may receive a second prompt identifying a request for a payout for the at least one wager recommendation. In some implementations, the one or more processors may generate, using the language model, the second prompt, and the data structure, second output comprising an indication of the payout for the at least one wager recommendation.

In some implementations, the one or more processors may receive an update to odds for the at least one wager recommendation. In some implementations, the one or more processors may update the data structure to include an indication of the update. In some implementations, the one or more processors may provide the updated data structure to the client device. In some implementations, the client device can be associated with a player profile, and the one or more processors may receive a request to terminate the communication session. In some implementations, the one or more processors may store the data structure in association with the player profile.

At least one aspect of the present disclosure is directed to a method of system. The method may include maintaining a plurality of wager opportunities corresponding to a plurality of live events. Each of the plurality of wager opportunities can correspond to a wager type. The method may include establishing a communication session with a client device. The method may include receiving, from the client device during the communication session, a prompt for a language model comprising a request. The method may include determining a classification of the request included in the prompt. The method may include generating an input context for the language model using the prompt and the classification. The method may include generating, using the language model and the input context, output including a data structure corresponding to formatting of a graphical element for at least one wager recommendation selected based on the prompt. The method may include providing the output to the client device in response to the request. The output can cause the client device to parse the data structure and generate the graphical element for display in a graphical user interface.

In some implementations, the data structure can include an indication of at least one live event of the plurality of live events. In some implementations, the client device can be associated with a player profile. The data structure can include instructions to generate an interactive element that, when interacted with, causes the client device to transmit a request to update the player profile based on the at least one wager recommendation. The method may include generating the data structure to include an indication that the at least one wager recommendation corresponds to a parlay wager. The method may include determining a number of wagers placed based on the at least one wager recommendation. The method may include updating the data structure to include an indication of the number of wagers placed.

In some implementations, the prompt can be a first prompt. The method may include receiving, from the client device, a second prompt indicating a request to update the at least one wager recommendation. The method can include generating, using the language model, the second prompt, and the data structure, second output including a second data structure corresponding to formatting of a second graphical element for the at least one wager recommendation. The method may include providing the second output to the client device, causing the client device to parse the second data structure and generate the second graphical element for display in the graphical user interface.

The method may include receiving from the client device, in response to an interaction with the graphical element, a request to place a wager corresponding to the at least one wager recommendation. The method may include updating a player profile associated with the client device according to the wager. In some implementations, the prompt can be a first prompt. The method may include receiving a second prompt identifying a request for a payout for the at least one wager recommendation. The method may include generating, using the language model, the second prompt, and the data structure, second output including an indication of the payout for the at least one wager recommendation. The method may include receiving an update to odds for the at least one wager recommendation. The method may include updating the data structure to include an indication of the update. The method may include providing the updated data structure to the client device. In some implementations, the client device can be associated with a player profile. The method may include receiving a request to terminate the communication session. The method may include storing the data structure in association with the player profile.

At least one aspect of the present disclosure is directed to a system. The system can include one or more processors coupled to memory. The one or more processors may receive from an application executing on the client device, during a communication session, a prompt for a language model including a request for information corresponding to the application. The one or more processors may identify, using the prompt, an identifier of a first application interface of the plurality of application interfaces of the application to satisfy the request for information. The one or more processors may generate, using the language model, the prompt, and the identifier, output including a data structure corresponding to formatting of a graphical element that, when interacted with, causes navigation to the first application interface. The one or more processors may provide the output to the client device in response to the request, causing the client device to parse the data structure and generate the graphical element for display in a graphical user interface.

In some implementations, the data structure may include data extracted from the first application interface. In some implementations, the prompt can be a first prompt. The one or more processors may determine that at least one application interface cannot be identified based on the first prompt. The one or more processors may provide an indication to the client device that the at least one application interface cannot be identified. The one or more processors may receive a second prompt from the client device. The one or more processors may identify, using the first prompt and the second prompt, the identifier of the first application interface.

In some implementations, the client device can be associated with a player profile. The data structure can include instructions to generate an interactive element that, when interacted with, causes the client device to transmit a request to update the player profile based on the at least one wager recommendation. The one or more processors may generate the data structure to include an indication that the at least one wager recommendation corresponds to a parlay wager. The one or more processors may determine a number of wagers placed based on the at least one wager recommendation. The one or more processors may update the data structure to include an indication of the number of wagers placed.

In some implementations, the prompt can be a first prompt. The one or more processors may receive, from the client device, a second prompt indicating a request to update the at least one wager recommendation. The one or more processors may generate, using the language model, the second prompt, and the data structure, second output including a second data structure corresponding to formatting of a second graphical element for the at least one wager recommendation. The one or more processors may provide the second output to the client device, causing the client device to parse the second data structure and generate the second graphical element for display in the graphical user interface. The one or more processors may receive, from the client device, in response to an interaction with the graphical element, a request to place a wager corresponding to the at least one wager recommendation. The one or more processors may update a player profile associated with the client device according to the wager.

In some implementations, the prompt can be a first prompt. The one or more processors may receive a second prompt identifying a request for a payout for the at least one wager recommendation. The one or more processors may generate, using the language model, the second prompt, and the data structure, second output including an indication of the payout for the at least one wager recommendation. The one or more processors may receive an update to odds for the at least one wager recommendation. The one or more processors may update the data structure to include an indication of the update. The one or more processors may provide the updated data structure to the client device.

At least one aspect of the present disclosure is directed to a method of system. The method may include receiving from an application executing on the client device, during a communication session, a prompt for a language model comprising a request for information corresponding to the application. The method may include identifying, using the prompt, an identifier of a first application interface of the plurality of application interfaces of the application to satisfy the request for information. The method may include generating, using the language model, the prompt, and the identifier, output including a data structure corresponding to formatting of a graphical element that, when interacted with, causes navigation to the first application interface. The method may include providing the output to the client device in response to the request, causing the client device to parse the data structure and generate the graphical element for display in a graphical user interface.

In some implementations, the data structure can include data extracted from the first application interface. In some implementations, the prompt can be a first prompt. The method may include determining that at least one application interface cannot be identified based on the first prompt. The method may include providing an indication to the client device that the at least one application interface cannot be identified. The method may include receiving a second prompt from the client device. The method may include identifying, using the first prompt and the second prompt, the identifier of the first application interface.

In some implementations, the client device can be associated with a player profile. The data structure can include instructions to generate an interactive element that, when interacted with, causes the client device to transmit a request to update the player profile based on the at least one wager recommendation. The method may include generating the data structure to include an indication that the at least one wager recommendation corresponds to a parlay wager. The method may include determining a number of wagers placed based on the at least one wager recommendation. The method may include updating the data structure to include an indication of the number of wagers placed.

In some implementations, the prompt can be a first prompt. The method may include receiving, from the client device, a second prompt indicating a request to update the at least one wager recommendation. The method may include generating, using the language model, the second prompt, and the data structure, second output including a second data structure corresponding to formatting of a second graphical element for the at least one wager recommendation. The method may include providing the second output to the client device, causing the client device to parse the second data structure and generate the second graphical element for display in the graphical user interface. The method may include receiving, from the client device, in response to an interaction with the graphical element, a request to place a wager corresponding to the at least one wager recommendation. The method may include updating a player profile associated the client device according to the wager.

At least one aspect of the present disclosure is directed to a system. The system can include one or more processors coupled to memory. The one or more processors may maintain, in one or more data structures, data corresponding to a plurality of historical wager opportunities and a set of formatting instructions. The one or more processors may generate, using the one or more data structures, a training dataset including at least one first training example, including: (i) a respective input context comprising data of a first wager opportunity of the plurality of wager opportunities, and (ii) a respective output message comprising display instructions for the first wager opportunity generated according to the set of formatting instructions. The one or more processors may update a language model using the training dataset.

In some implementations, the data structure can further include a plurality of deep links corresponding to a plurality of application interfaces of an application. The one or more processors may generate the training dataset to include a second training example, including: (i) a respective input context comprising data of a first deep link of the plurality of deep links, and (ii) a respective output message including second display instructions for the first deep link generated according to a second set of formatting instructions. In some implementations, the second set of formatting instructions can be different from the first set of formatting instructions.

In some implementations, the one or more processors may maintain a plurality of sets of formatting instructions. Each set of the plurality of sets of formatting instructions can correspond to a respective type of wager opportunity. The plurality of sets of formatting instructions can include the set of formatting instructions. The one or more processors may select the set of formatting instructions from the plurality of sets of formatting instructions for the at least one training example based on a type of the first wager opportunity.

In some implementations, the one or more processors may generate the input context to include a prompt requesting a wager recommendation and data of the first wager opportunity selected based on the prompt. In some implementations, the data of the first wager opportunity can correspond to a first data structure format, and the display instructions for the first wager opportunity can correspond to a second data structure format. In some implementations, the first wager opportunity can include a parlay wager opportunity including a plurality of legs. In some implementations, the display instructions can be configured to cause presentation of a content item identifying the plurality of legs of the parlay wager opportunity. In some implementations, the display instructions can be configured to present a content item including an interactive element that, when interacted with, causes transmission of a request to place a wager corresponding to the first wager opportunity. In some implementations, the display instructions can include at least one identifier of a network location from which odds for the first wager opportunity are to be retrieved. In some implementations, the one or more processors may update the language model to generate at least one token identifying a start position of the display instructions in output generated by the language model.

At least one aspect of the present disclosure is directed to a method of system. The method may include maintaining, in one or more data structures, data corresponding to a plurality of historical wager opportunities and a set of formatting instructions. The method may include generating, using the one or more data structures, a training dataset including at least one first training example, including: (i) a respective input context comprising data of a first wager opportunity of the plurality of wager opportunities, and (ii) a respective output message comprising display instructions for the first wager opportunity generated according to the set of formatting instructions. The method may include updating a language model using the training dataset.

In some implementations, the one or more data structures can further include a plurality of deep links corresponding to a plurality of application interfaces of an application. The method may include generating the training dataset to comprise a second training example, including: (i) a respective input context comprising data of a first deep link of the plurality of deep links, and (ii) a respective output message comprising second display instructions for the first deep link generated according to a second set of formatting instructions. In some implementations, the second set of formatting instructions can be different from the first set of formatting instructions.

The method may include maintaining a plurality of sets of formatting instructions. Each set of the plurality of sets of formatting instructions can correspond to a respective type of wager opportunity. The plurality of sets of formatting instructions can include the set of formatting instructions. The method may include selecting the set of formatting instructions from the plurality of sets of formatting instructions for the at least one training example based on a type of the first wager opportunity. The method may include generating the input context to include a prompt requesting a wager recommendation and data of the first wager opportunity selected based on the prompt. In some implementations, the data of the first wager opportunity can correspond to a first data structure format, and the display instructions for the first wager opportunity can correspond to a second data structure format.

In some implementations, the first wager opportunity can include a parlay wager opportunity including a plurality of legs. In some implementations, the display instructions can be configured to cause presentation of a content item identifying the plurality of legs of the parlay wager opportunity. In some implementations, the display instructions can be configured to present a content item including an interactive element that, when interacted with, causes transmission of a request to place a wager corresponding to the first wager opportunity. In some implementations, the display instructions can include at least one identifier of a network location from which odds for the first wager opportunity are to be retrieved. The method may include updating the language model to generate at least one token identifying a start position of the display instructions in output generated by the language model.

At least one aspect of the present disclosure is directed to a system. The system can include one or more processors coupled to memory. The one or more processors may receive, from a client device during a communication session, a prompt for a language model comprising a request relating to a potential wager. The one or more processors may generate, using the language model and the prompt, an output including an indication of at least one wager opportunity to satisfy the request. The one or more processors may generate, based on the prompt and the output, a content item including text data corresponding to at least one second prompt for the communication session. The one or more processors may provide the output and the content item to the client device in response to the prompt, causing the client device to present the output with the content item in a graphical user interface.

In some implementations, the one or more processors may generate the text data of the content item using the language model. In some implementations, the at least one wager opportunity can be a parlay wager opportunity. In some implementations, the text data can identify at least one additional leg for the parlay wager opportunity. In some implementations, the one or more processors may receive, from the client device during the communication session, an additional prompt including the text data. In some implementations, the one or more processors may generate, using the language model, the output, and the additional prompt, second output for the communication session including a second indication of at least one second wager opportunity identifying the at least one additional leg.

In some implementations, the one or more processors may retrieve, from one or more data structures storing data of a plurality of wager opportunities, at least one additional wager based on the prompt and the output. In some implementations, the one or more processors may generate the text data of the content item based on the at least one additional wager. In some implementations, the one or more processors may receive, from the client device, an indication of an interaction with the content item. In some implementations, the one or more processors may generate an input context for the language model based on the text data of the content item. In some implementations, the one or more processors may generate second output using the language model and the input context. In some implementations, the one or more processors may generate a second content item for the communication session based on the input context and the second output.

In some implementations, the client device can be associated with a player profile. In some implementations, the one or more processors may generate the text data for the content item further based on data retrieved from the player profile. In some implementations, the data retrieved from the player profile can identify at least one historical action performed using the player profile. In some implementations, the one or more processors may generate the text data for the content item further based on the at least one historical action. In some implementations, the one or more processors may generate a plurality of content items including the content item. Each of the plurality of content items can include respective second text data. In some implementations, the one or more processors may provide the plurality of content items for display with the output generated by the language model.

At least one aspect of the present disclosure is directed to a method of system. The method may include receiving, from a client device during a communication session, a prompt for a language model comprising a request relating to a potential wager. The method may include generating, using the language model and the prompt, an output comprising an indication of at least one wager opportunity to satisfy the request. The method may include generating, based on the prompt and the output, a content item comprising text data corresponding to at least one second prompt for the communication session. The method may include providing the output and the content item to the client device in response to the prompt, causing the client device to present the output with the content item in a graphical user interface.

The method may include generating the text data of the content item using the language model. In some implementations, the at least one wager opportunity can be a parlay wager opportunity. In some implementations, the text data can identify at least one additional leg for the parlay wager opportunity. The method may include receiving, from the client device during the communication session, an additional prompt comprising the text data. The method may include generating, using the language model, the output, and the additional prompt, second output for the communication session including a second indication of at least one second wager opportunity identifying the at least one additional leg.

The method may include retrieving, from one or more data structures storing data of a plurality of wager opportunities, at least one additional wager based on the prompt and the output. The method may include generating the text data of the content item based on the at least one additional wager. The method may include receiving, from the client device, an indication of an interaction with the content item. The method may include generating an input context for the language model based on the text data of the content item. The method may include generating second output using the language model and the input context. The method may include generating a second content item for the communication session based on the input context and the second output.

In some implementations, the client device can be associated with a player profile. The method may include generating the text data for the content item further based on data retrieved from the player profile. In some implementations, the data retrieved from the player profile can identify at least one historical action performed using the player profile. The method may include generating the text data for the content item further based on the at least one historical action. The method may include generating a plurality of content items including the content item. Each of the plurality of content items can include respective second text data. The method may include providing the plurality of content items for display with the output generated by the language model.

At least one aspect of the present disclosure is directed to a system. The system can include one or more processors coupled to memory. The one or more processors may maintain a plurality of content items, respectively, identifying a plurality of application interfaces of an application executing on a client device. The one or more processors may receive a prompt for a language model from the application executing on the client device during a communication session. The one or more processors may generate, using the language model and the prompt, output text data that is responsive to the prompt. The one or more processors may select, based on the prompt and the output text data, a content item from the plurality of content items, the content item including an interactive element that, when interacted with, causes the application executing on the client device to navigate to a respective application interface of the plurality of application interfaces. The one or more processors may provide the output text data and the content item to the client device in response to the prompt, causing the client device to present the output text data with the content item in a graphical user interface.

In some implementations, the one or more processors may generate at least a portion of the content item using the language model and the output text data. In some implementations, the one or more processors may generate at least a portion of the content item using the language model and the respective application interface identified in the content item. In some implementations, the content item can include at least one image associated with the respective application interface. In some implementations, the one or more processors may receive, from the application executing on the client device, an indication of an interaction with the content item. In some implementations, the one or more processors may provide, in response to the indication, data of the application interface to the application for display.

In some implementations, the client device can be associated with a player profile. In some implementations, the one or more processors may select the content item further based on data of the player profile. In some implementations, the one or more processors may select the content item using a searching function, the prompt, and the output text data. In some implementations, the one or more processors may extract one or more portions of the prompt and the output text data. In some implementations, the one or more processors may select the content item using the one or more portions of the prompt and the output text data.

In some implementations, the one or more processors may maintain data of a plurality of contests for one or more live events, the plurality of contests respectively corresponding to a plurality of second content items. In some implementations, the one or more processors may generate, using the language model and a second prompt received from the client device, second output text data that is responsive to the second prompt. In some implementations, the one or more processors may select, based on the second prompt and the second output, a second content item from the plurality of second content items, the second content item comprising a second interactive element that, when interacted with, causes the application executing on the client device to transmit a request corresponding to a respective contest of the plurality of contests. In some implementations, the one or more processors may provide the second output and the second content item to the client device. In some implementations, the one or more processors may receive, from the application executing on the client device, an indication of an interaction with the second content item. In some implementations, the one or more processors may provide, to the application executing on the client device, at least one second graphical user interface corresponding to the respective contest.

At least one aspect of the present disclosure is directed to a method of system. The method may include maintaining a plurality of content items, respectively, identifying a plurality of application interfaces of an application executing on a client device. The method may include receiving a prompt for a language model from the application executing on the client device during a communication session. The method may include generating, using the language model and the prompt, output text data that is responsive to the prompt. The method may include selecting, based on the prompt and the output text data, a content item from the plurality of content items. The content item can include an interactive element that, when interacted with, causes the application executing on the client device to navigate to a respective application interface of the plurality of application interfaces. The method may include providing the output text data and the content item to the client device in response to the prompt, causing the client device to present the output text data with the content item in a graphical user interface.

The method may include generating at least a portion of the content item using the language model and the output text data. The method may include generating at least a portion of the content item using the language model and the respective application interface identified in the content item. In some implementations, the content item can include at least one image associated with the respective application interface. The method may include receiving, from the application executing on the client device, an indication of an interaction with the content item. The method may include providing, in response to the indication, data of the application interface to the application for display. In some implementations, the client device can be associated with a player profile. The method may include selecting the content item further based on data of the player profile.

The method may include selecting the content item using a searching function, the prompt, and the output text data. The method may include extracting one or more portions of the prompt and the output text data. The method may include selecting the content item using the one or more portions of the prompt and the output text data. The method may include maintaining data of a plurality of contests for one or more live events. The plurality of contests, respectively, can correspond to a plurality of second content items. The method may include generating, using the language model and a second prompt received from the client device, second output text data that is responsive to the second prompt. The method may include selecting, based on the second prompt and the second output, a second content item from the plurality of second content items. The second content item can include a second interactive element that, when interacted with, causes the application executing on the client device to transmit a request corresponding to a respective contest of the plurality of contests. The method may include providing the second output and the second content item to the client device. The method may include receiving, from the application executing on the client device, an indication of an interaction with the second content item. The method may include providing, to the application executing on the client device, at least one second graphical user interface corresponding to the respective contest.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form. For example, by appropriate computer programs, which may be carried on appropriate carrier media (e.g., computer readable media), which may be tangible carrier media (e.g., disks) or intangible carrier media (e.g., communications signals). Aspects may also be implemented using suitable apparatuses, which may take the form of programmable computers running computer programs arranged to implement the aspect. As used in the specification and in the claims, the singular form of “a”, “an”, and “the” include plural referents unless the context clearly dictates otherwise.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1:
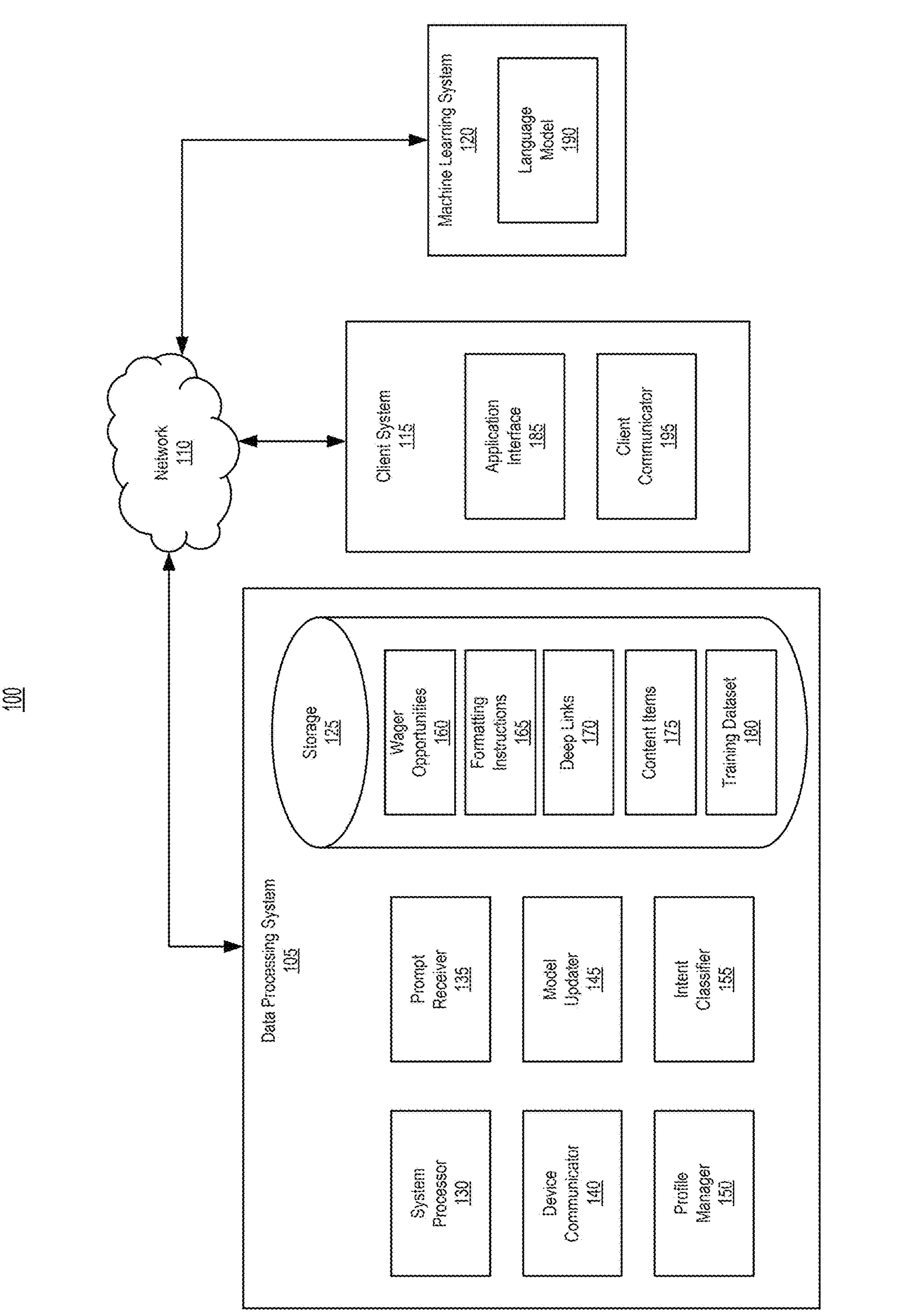
FIG. 1 illustrates a block diagram of an example system for providing machine-learning system functionalities, in accordance with one or more implementations.

Below are detailed descriptions of various concepts related to, and implementations of, techniques, approaches, methods, apparatuses, and systems for providing interactive game experiences. The various concepts introduced above and discussed in greater detail below may be implemented in any of numerous ways, as the described concepts are not limited to any particular manner of implementation. Examples of specific implementations and applications are provided primarily for illustrative purposes.

Natural language processing techniques can be applied across a wide range of computing environments to generate responses or other outputs based on natural language prompts. Language models and other machine-learning models can be used in various applications, including but not limited real-time information retrieval interfaces, which can be limited according to processing capacity of the systems executing such machine-learning models. To perform such operations, a language model can process input data sequences that represent prompts, contextual information, and other relevant data.

As language models typically include a large number of parameters, invoking such language models typically requires significant processing resources that make language models challenging to use for certain applications (e.g., real-time or near real-time applications. The number of operations and the amount of memory used to process a prompt is generally influenced by the size of the input context provided to the language model. Input contexts can include historical exchanges, metadata, and/or external reference information that may be relevant to generating an accurate or contextually suitable output. Generating suitable outputs typically involves providing large amounts of information as input to language models, which can significantly hinder performance, both in terms of accuracy and execution performance (e.g., computing resource utilization).

Conventional techniques for supplying input contexts to language models fail to ameliorate these issues. For example, conventional approaches often require sending large contexts, which often include an entire accumulated input, across multiple requests to achieve a requested output. Increasing the size of the input context results in increased network latency and bandwidth consumption. During output generation, executing language models with large input contexts causes processor load and increased memory allocation that grow at rates that reduce the feasibility of using language model in many real-time or near real-time applications. As a result, existing systems experience limited throughput, excessive memory consumption, and elevated network resource usage.

The techniques described herein address these and other issues by generating targeted input contexts for a language model that include only data determined to be relevant to a given prompt. In general, the techniques can select prompt-specific subsets of available context data based on one or more classification processes and/or rule-based policies. By constructing an input context from only the selected subset, the techniques described herein can significantly reduce the processing resources needed to process the input context without omitting information that is pertinent to generating an accurate output. Such context selection operations can be perform in connection with session-based data persistence, such that follow-on prompts can be processed according to previously stored interaction data, in some implementations.

By selectively reducing the contents of an input context based on prompt relevance and by avoiding redundant transmission of static context data, the techniques described herein can lower processing time and memory requirements for language model execution. Network bandwidth consumption can also be reduced because only incremental or newly relevant data is transmitted for follow-on prompts, rather than the entire accumulated context. These improvements can provide faster response times for multi-turn interactions, sustain throughput in high-load scenarios, and enable the use of large-scale language models within low-latency applications where conventional approaches would exceed performance constraints.

In further detail, various implementations of the systems and methods described herein can be used to reduce processor utilization and memory consumption when processing prompts with additional contextual input via one or more language models or other machine-learning models. For example, a system can maintain one or more data structures storing specific information that can be automatically selected for inclusion in an input context of the language/machine-learning models. As noted above, the computing resources (e.g., computing time and/or memory/caching consumption) used to execute language models or other natural language processing functions on computers increase at least quadratically with the size of the input context (e.g., the input data to be processed). Executing language models using existing techniques therefore restricts the context size according to the expected/target processing time of a corresponding request. For real-time or near real-time applications, such extended delays make using language models impossible to use.

To address these challenges, the systems and methods described herein can dynamically generate an input context that includes a subset of data that can be used to carry out requested computing operations. Such automatic selection may be performed, for example, according to intent classification operations executed using additional machine-learning models and/or specific rules-based selection policies. By automatically selecting certain data to be included in the input context, the systems and methods described herein automatically limit the input context for the language model to a targeted subset of available data, thereby reducing the latency (e.g., processing time) and memory allocation required to carry out the requested operations using the language model. As a result, the systems and methods described herein operate more efficiently, and allow for the use of language models in real-time or near real-time processing applications, which would otherwise be impossible to implement using existing techniques.

Such example implementations may include implementations in which language models are used to dynamically generate application interfaces for network environments through the application of machine learning. The technical solutions described herein can improve upon conventional solutions by using specific intent-derived inputs to generate instructions to present application- and context-specific user interfaces, thereby improving the efficiency of large language models (LLMs) in real-time data processing and interaction. In some example implementations, the systems and methods described herein provide techniques for allocating computational resources dynamically, for example, to adjust in real-time to the demands of LLMs and the applications they support. Moreover, the technical solutions described herein can improve the real-time performance of by implementing pre-processing techniques to efficiently select and provide specific, context-related input data to the LLMs for generation of application interfaces. In doing so, the techniques described herein provide pre-processing and classification techniques that may simplify input to LLMs, improving both output accuracy and significantly reducing the computational resources used to generate suitable outputs.

Additionally, the technical solutions described herein can address the challenge of hallucinations in LLM outputs, where the model generates responses that are plausible but incorrect. For example, by generating improved input contexts with particular data from up-to-date data sources using structured input, the systems and methods described herein can reduce the likelihood of hallucinatory responses from the LLM. Some implementations described herein can perform additional training and fine-tuning processes that update LLMs to adapt to new data and correct any inaccuracies in their responses. Unlike conventional approaches, which fail to produce accurate and consistent LLM output, the techniques described herein can process data for LLMs to reduce instances of hallucinations and increase output precision and accuracy.

The techniques described herein include features and functionalities relating to improved machine learning for processing prompt data. For purposes of reading the descriptions of the various implementations below, the following descriptions of the sections of the Specification and their respective contents may be helpful:

I. Section A describes a remote or local computing environment that may be useful for providing machine-learning system functionalities.
II. Section B describes systems and methods for generating formatting instructions for wagers.
III. Section C describes systems and methods for generating instructions to display deep links.
IV. Section D describes systems and methods for training language models to generate display instructions.
V. Section E describes systems and methods for generating content items using language models.
VI. Section F describes systems and methods for selecting additional content based on conversational data.
VII. Section G describes a computing and networking environment that may be useful for practicing the implementations described herein.

A. Remote or Local Computing Environment for Providing Machine-Learning System Functionalities Referring to FIG. 1, depicted is a block diagram of an example system 100 for providing machine-learning system functionalities, in accordance with one or more implementations. In FIG. 1, the system 100 can include at least one data processing system 105, at least one network 110, at least one client system 115, and at least one machine learning system 120. In FIG. 1, the data processing system 105 can include at least one storage 125, at least one system processor 130, at least one prompt receiver 135, at least one device communicator 140, at least one model updater 145, at least one profile manager 150, and at least one intent classifier 155. The storage 125 can include one or more wager opportunities 160, one or more formatting instructions 165, one or more deep links 170, one or more content items 175, and one or more training datasets 180. The client system 115 can include at least one application interface 185 and at least one device communicator 140. The machine learning system 120 can include at least one language model 190.

The data processing system 105 can include a physical computer system operatively coupled or couplable with one or more components of the system 100. The data processing system 105 can include a cloud system, a server, a distributed remote system, or any combination thereof. The data processing system 105 can include a virtual computing system, an operating system, and a communication bus to effect communication and processing. The data processing system 105 can include physical infrastructure, such as physical servers, storage devices, and network equipment housed in data centers. The data processing system 105 can include a virtual computing system, which can include cloud-based virtual machines or containers for running applications and services. The data processing system 105 can include an operating system that can function as the core manager, allocating resources, configuring processes, and maintaining seamless interaction between hardware and applications. The data processing system 105 can include a communication bus that can facilitate communication between different components within the system. The data processing system 105 can connect with external systems to allow for data exchange and service delivery to client systems 115.

The client system 115 can include a computing system that can be used to access the functionality of the data processing system 105. The client system 115 can include a smart phone, mobile device, laptop computer, desktop computer, one or more servers, or any other type of computing device. The client system 115 can include at least one processor and a memory, e.g., a processing circuit. The memory can store processor-executable instructions that, when executed by the processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language.

The client system 115 can include one or more devices to receive input from a player and/or to provide output to a player. For example, the output capabilities of the application interface 185 can be presented by a display device that provides visual feedback to the player. The display device can include electronic displays, such as liquid crystal displays (LCD), light-emitting diode (LED) displays, or organic light-emitting diode (OLED) displays. The electronic displays can implement interactive features, including capacitive or resistive touch input, allowing for multi-touch functionality. The input functionalities can include a keyboard, mouse, or an integrated touch-sensitive panel on the display device, but are not limited thereto.

The machine learning system 120 can include one or more machine learning models trained on various datasets, including but not limited to datasets for large language models. The machine learning system 120 can include a cloud system, one or more servers, a distributed remote system, or any combination thereof. The machine learning system 120 can include processing components that include, but are not limited to, one or more central processing units (CPUs), one or more graphics processing unit (GPUs), tensor processing units (TPUs), or the like. The machine learning system 120 can include a memory operable to store one or more instructions for operating components of the machine learning system 120 and operating components operably coupled to the machine learning system 120. For example, the instructions can include firmware, software, hardware, operating systems, or embedded operating systems, among others. The machine learning system 120 can be internal to the data processing system 105. For example, although shown as separate from the data processing system 105, in some implementations the machine-learning system 120 (or the functionality thereof) may be implemented as part of the data processing system. In some implementations, the machine learning system 120 can be external to the data processing system 105 and can be accessed via the network 110, for example, using one or more API keys or authentication processes to process input contexts and/or prompts from the data processing system 105. In some implementations, the machine learning system 120 implement or otherwise provide access to one or more application programming interfaces (APIs), via which the data processing system 105 and/or the client system 115 can access the language model 190 or other functionality of the machine learning system 120.

The network 110 can include computer networks such as the Internet, local, wide, metro, or other area networks, intranets, satellite networks, other computer networks such as voice or data mobile phone communication networks, and combinations thereof. The data processing system 105 of the system 100 can establish a communication session via the network 110, for example, with the client systems 115 and/or the machine learning system 120. Establishing a communication session can refer to creating a temporary connection between two or more devices to exchange information. For example, this can include setting up a data exchange session between the client system 115 and the data processing system 105. The network 110 may be any form of computer network that can relay information between the data processing system 105, the client system 115, the machine learning system 120, and one or more information sources, such as web servers or external databases, amongst others. The network 110 can include the Internet and/or other types of data networks, such as a local area network (LAN), a wide area network (WAN), a cellular network, a satellite network, or other types of data networks. The network 110 can include any number of computing devices (e.g., computers, servers, routers, network switches, etc.) that are configured to receive and/or transmit data within the network 110. The network 110 can further include any number of hardwired and/or wireless connections. Any or all of the computing devices described herein (e.g., the data processing system 105, the client system 115, the machine learning system 120, etc.) can communicate wirelessly (e.g., via Wi-Fi, cellular, radio, etc.) with a transceiver that is hardwired (e.g., via a fiber optic cable, a CAT5 cable, etc.) to other computing devices in the network 110. Any or all of the computing devices described herein can communicate wirelessly with the computing devices of the network 110 via a proxy device (e.g., a router, network switch, or gateway).

The data processing system 105 is shown as including the storage 125. The storage 125 can be a computer-readable memory that can store or maintain any of the information described herein. The storage 125 can store data associated with the system 100. The storage 125 can include one or more hardware memory devices to store binary data, digital data, or the like. The storage 125 can include one or more electrical components, electronic components, programmable electronic components, reprogrammable electronic components, integrated circuits, semiconductor devices, flip flops, arithmetic units, or the like. The storage 125 can include at least one of a non-volatile memory device, a solid-state memory device, a flash memory device, or a NAND memory device. The storage 125 can include one or more addressable memory regions disposed on one or more physical memory arrays. A physical memory array can include a NAND gate array disposed on, for example, at least one of a particular semiconductor device, an integrated circuit device, or a printed circuit board device. In an aspect, the storage 125 can correspond to a non-transitory computer readable medium. In an aspect, the non-transitory computer readable medium can include one or more instructions executable by the system processor 130.

The storage 125 can store/maintain one or more data structures, which can include containers, indices, or otherwise store each of the values, pluralities, sets, variables, vectors, numbers, or thresholds described herein. In some implementations, the storage 125 can store, modify, or otherwise maintain any of the information described herein using one or more databases. The storage 125 can be accessed using one or more memory addresses, index values, or identifiers of any item, structure, or region maintained in the storage 125. The storage 125 can be accessed by the components of the data processing system 105, the client system 115, the machine learning system 120, or any other computing device described herein, via the network 110. The storage 125 can be internal to the data processing system 105. The storage 125 can exist external to the data processing system 105 and can be accessed via the network 110. For example, the storage 125 can be distributed across many different computer systems (e.g., a cloud computing system) or storage elements and may be accessed via the network 110 or a suitable computer bus interface.

The data processing system 105, the client system 115, or the machine learning system 120 can store in the storage 125 the results of any or all computations, determinations, selections, identifications, generations, constructions, or calculations in one or more data structures indexed or identified with appropriate values. Any or all values stored in the storage 125 can be accessed by any computing device described herein, such as the data processing system 105, the client system 115, or the machine learning system 120, to perform any of the functionalities or functions described herein. In implementations where the storage 125 forms a part of a cloud computing system, the storage 125 can be a distributed storage medium in a cloud computing system and can be accessed by any of the components of the data processing system 105, the client system 115, the machine learning system 120, or by any other computing devices described herein.

The storage 125 can store wager opportunities 160 for one or more live events. The wager opportunities 160 can include event information, identifying the specific live event each wager is tied to, such as team names, game details, etc. The wager opportunities 160 can include bet options, including different types of bets available for each event, such as moneyline, point spread, or over/under, among other markets. The wager opportunities 160 can include odds, for example, the payout ratio associated with each wager and how much a winning wager would return. The wager opportunities 160 can include an indication of a live event. The live event can function as an identifier or reference, pointing to a specific ongoing or upcoming live event. The wager opportunities 160 can include an indication of a parlay or a single bet recommendation. For example, the wager opportunities 160 can include flags or markers indicating whether a wager is a parlay or a single bet. The wager opportunities 160 can include a record of the number of wagers placed. The wager opportunities 160 can include data corresponding to historical wager opportunities (e.g., past wagers) used to calculate or adjust the odds associated with the current wager opportunities.

In some implementations, odds associated with wager opportunities 160 can be dynamically adjusted based on various factors, such as live event data/developments, fluctuations in betting volume, and historical wager patterns, among others. In some implementations, upon detecting significant events, such as scores or timeouts, the data processing system 105 can recalculate and adjust wager odds. In some implementations, the data processing system 105 can track the popularity of specific wager types or specific wager opportunities, such as single game parlays, quick single game parlays (Quick SGPs), by tracking the number of times the corresponding wager types/opportunities have been selected. For example, each wager opportunity 160 can include or be associated with a counter that is incremented each time the wager opportunity is placed by a player via the data processing system 105. In some implementations, and as described in further detail herein, the counter may be displayed as part of one or more content items 170 corresponding to the wager opportunity 160. Furthermore, based on prompts and betting trends, the data processing system 105 can categorize or flag wager opportunities 160 as components or legs of parlay wagers.

The storage 125 can store multiple sets (e.g., a plurality) of formatting instructions 165, which may be generated in part based on output from the language model 190. In some implementations, each set of formatting instructions 165 can correspond to a respective type of wager opportunity 160 (e.g., moneyline, parlay, etc.). The formatting instructions 165 can include instructions to present different graphical elements corresponding to different attributes or properties of the wager opportunities 160. The content/arrangement of the wager opportunities may depend on, or be a function of, the type of the wager opportunity for which the formatting instructions 165 are provided. For example, the formatting instructions 165 can include display instructions. The display instructions can cause the presentation of the wager opportunities 160 on the application interface 185. The display instructions can include JavaScript, Hypertext Markup Language 5 (HTML5) data, or other types of display instructions. The formatting instructions 165 can specify elements such as text formatting, layout, and the inclusion of visual components or graphical assets, among others.

The formatting instructions 165 can include instructions for presenting interactive elements, such as buttons or links associated with the wager opportunities 160 (e.g., to place the wager, navigate to a specification application, access specific functionalities, etc.). In some implementations, the formatting instructions 165 can include instructions and/or indications to retrieve information from one or more network locations. For example, the formatting instructions 165 can include one or more identifiers for one or more network locations of graphical/audio/video assets or information relating to one or more wager opportunities 160. These identifiers can indicate a web address or other reference point that the data processing system 105, the client system 115, or the machine learning system 120 can use to retrieve relevant information regarding the wager (e.g., retrieving the latest odds for a particular wager opportunity). The formatting instructions 165 can indicate a graphical layout location (e.g., relative or absolute location) that can be used for instances where multiple content items representing wager opportunities 160 are displayed on the application interface 185. For instance, the layout information can specify the order or location in which a particular wager opportunity 160 is to appear (e.g., sorting in chronological order, relevance to an ongoing contest, ranking by priority, etc.).

In some implementations, the data used for processing wager opportunities 160 and the data used to generate the application interface 185 can be structured differently. For example, for parlay wager opportunities, the formatting instructions 165 can include presentation/layout instructions to present multiple legs of the wager in one or more content items. Such formatting instructions 165 can include instructions for hierarchical layouts or graphical elements, in some implementations. In some implementations, the formatting instructions 165 can incorporate interactive elements such as buttons or links that, when clicked or interacted with, automatically cause the application presenting the interactive elements to transmit requests to place one or more wagers corresponding to the wager opportunities 160 associated with the formatting instructions 165. The formatting instructions 165 can include information about where to extract real-time odds for the wager, allowing dynamic updates of the wager details. The formatting instructions 165 may be generated by, or generated in part by, one or more language models 190, as described herein. The formatting instructions may be formatted as structured data that indicate one or more properties of different wager opportunities 160, deep links 170, or any other content described herein.

The storage 125 can store a plurality of deep links 170. The deep links 170 can be uniform resource locators (URLs) or uniform resource identifiers (URIs) that identify a location of one or more corresponding application or network interfaces. Deep links 170 identifying an application interface can identify specific functionalities or content within an application. The deep links 170 can allow the client system 115 to navigate to different sections or functionalities of the application(s) executed by the client system 115, in some implementations. Each deep link 170 stored in the storage 125 can correspond to one or more different application interfaces within an application. For example, a single application can have multiple deep links 170 associated with different functionalities, allowing access from various sources (external or within the application itself). The data processing system 105 can store, via the storage 125, a database or index of application interfaces and their associated deep links 170. In some implementations, the centralized repository can provide lookups and retrievals of deep links 170 based on various criteria, including application name, interface type, or specific content, among others.

The storage 125 can store one or more content items 175. The content item 175 can be any digital content that can include different content formats, including media and interactive modules. The content item 175 can be visual or graphical elements used within the application. For example, the content item 175 can include an image, such as a preview, icon, or other visual representations associated with specific application interfaces. The content item 175 can include an interactive element, which can be a button, link, or any clickable component. When a player interacts with the interactive elements (e.g., select, click-on, touch, hover), the interaction can trigger navigation within the application running on the client system 115. The content item 175 can provide attributes for the corresponding application interface. The content item 175 can include an event identifier (ID), which can be an identifier for a specific event within the application. In some implementations, the content item 175 can include, but is not limited to, creator ID, sport type, bet limits, odds limits, event status, expiration time, or event information, among other attributes/properties/characteristics. An event can be referred to as any sporting or competitive activity that functions as the basis for wagering. In some implementations, an event may refer to any video or broadcast stream for which wagers can be provided. In some implementations, events can refer to specific moments within a live sporting event upon which wagers can be placed (e.g., events for which live betting can occur). The event can include specific sporting events, tournaments, brackets, or other any activity or outcome on which wager(s) can be placed, including but not limited to individual contests between teams or players. The event can include entire competitions with multiple live events.

The storage 125 can store one or more training datasets 180. A training dataset 180 can include a collection of structured data used to train the language model 190 (or other machine learning models described herein) to perform specific tasks. The data processing system 105 can collect data from sources such as sports data providers, betting platforms, player interactions, and more, through data extraction. The data processing system 105 can address missing values, inconsistencies, and outliers to maintain data quality, for example, through data cleaning or preprocessing. The data processing system 105 can aggregate data from multiple sources to generate training datasets 180. In some implementations, the data processing system 105 can generate additional training examples for training datasets 180, for example, using data augmentation techniques.

The training dataset 180 may include pairs of input prompts and output responses, which may be used to train/update the language model 190 and/or adapters therefor. The input prompts may include natural language prompts that may have been transmitted by one or more players, as well as any other additional input context data that may be used to generate corresponding output. The training dataset 180 can be comprised of individual data points, referred to as training examples. Each training example can include an input and a corresponding output. The training dataset 180 can be labeled (where the outcome is known) or unlabeled (where the outcome is not known), depending on the type of learning, such as supervised or unsupervised learning. In supervised learning, the training dataset 180 can include labeled examples where the input can include a specific sporting event (e.g., a basketball game between Team A and Team B), as well as an identifier of a wager opportunity 160 (or simulated wager opportunity), which may include bet type (e.g., moneyline) and corresponding odds.

In one example, the training examples may include input data from one or more players as well as structured data providing search results of one or more historical wager opportunities 160 retrieved based on the corresponding input data. For example, the input context may include natural language text requesting a wager for a particular sports team, intent information derived from the natural language text (as described herein), and structured data of one or more wager opportunities 160 corresponding to the natural language text. The output data of the training example may include natural language output relating to the particular structured data. In some implementations, the output data may include structured output such as formatting instructions 165 that are modified to accommodate the data of at least one of the one or more wager opportunities 160 of the input context.

In some implementations, the training dataset 180 can include function calling datasets. The function calling datasets can include prompt-response pairs, where the response can include calling specific function to execute any of the operations performed by the data processing system 105, as described herein. In some implementations, the training dataset 180 can include conversational datasets, which can be used for training and evaluating the language model 190. The conversational datasets can include collections of comments, conversations, or other input information relating to one or more wager opportunities 160, deep links 170, or other information requested by one or more players. In some implementations, the data processing system 105 can generate artificial data to supplement training datasets 180 using synthetic data generation techniques. For example, the data processing system 105 can generate additional training examples by copying and varying features from existing training examples, or by transform existing examples according to one or more predetermined rulesets or instructions to improve the diversity of the training datasets 180. Once the training dataset 180 is generated, the machine learning model can undergo an iterative learning process. For example, the model can be presented with prompts related to sports events and wagers, and the model can generate predictions or classifications. These predictions can be compared to the known outcomes, and the model's parameters can be adjusted accordingly.

In some implementations, the training dataset 180, historical wager opportunities 160 and corresponding deep links 170 can be collected and stored in structured data formats. These datasets, along with predefined formatting instructions 165 for different wager types and deep link presentations, can be used to generate training examples. In one example, each training example can include a wager opportunity or deep link as input and the desired output format as output. In this manner, a machine learning model can learn to generate the desired content and layouts. In some implementations, the training examples of the training dataset 180 can simulate player requests for wager recommendations. In some implementations, the training examples of the training dataset 180 can update the. These prompts, combined with relevant wager data, can be used to create additional training examples. The machine learning model can learn to generate customized wager recommendations based on player preferences and available options.

The data processing system 105 can include the system processor 130. The system processor 130 can execute one or more instructions associated with the data processing system 105. The system processor 130 can include an electronic processor, an integrated circuit, or the like, including one or more of digital logic, analog logic, digital sensors, analog sensors, communication buses, volatile memory, nonvolatile memory, and the like. The system processor 130 can include, but is not limited to, at least one central processing unit (CPU), graphics processing unit (GPU), physics processing unit (PPU), tensor processing unit (TPU), embedded controller (EC), or the like. The system processor 130 can include a memory operable to store or storing one or more instructions for operating components of the system processor 130 and operating components operably coupled to the system processor 130. For example, the one or more instructions can include one or more of firmware, software, hardware, operating systems, or embedded operating systems. The system processor 130 or the data processing system 105 can include one or more communication bus controllers to effect communication between the system processor 130 and the other elements of the data processing system 105.

The data processing system 105 can include the prompt receiver 135. The prompt receiver 135 can be or include any script, file, program, application, set of instructions, or computer-executable code that is configured to process input data in the form of a prompt. The prompt receiver 135 can include hardware, software, or any combination. A prompt can include any player-provided command, request, or text data. The prompt can include a request or information relating to bet placement, such as an indication of a wager type, a wager amount, or selecting specific live events or outcomes. The prompt receiver 135 can receive the prompt from the client system 115 in natural language (e.g., a text string). The prompt receiver 135 can receive prompts through player interactions with the application interface 185. Player interactions can include clicking buttons, entering text, or using voice commands within one or more application interfaces 185, among others. In some implementations, the prompt receiver 135 can expose an API endpoint, allowing other applications or systems to send prompts in structured formats such as JavaScript Object Notation (JSON) or XML to the data processing system 105 for processing according to the techniques described herein. In some implementations, the prompt receiver 135 can subscribe to a message queue where prompts are published by other components/devices of the system 100, for example, according to a publisher-subscriber communication protocol. In some implementations, the prompt receiver 135 can identify specific events or triggers, such as player actions or system state changes, which can generate prompts. In some implementations, the prompt receiver 135 can process prompts loaded from files stored on the data processing system 105.

In some implementations, the prompt receiver 135 can parse and process the prompts to extract information, such as wager type, amount, and live event selections, among others. The prompt receiver 135 can execute functions in response to receiving a prompt. The prompt receiver 135 can provide a prompt, as well as any information extracted therefrom, to other components of the data processing system 105 for further processing according to the techniques described herein. The prompt receiver 135 can format the prompt into a standardized data structure, in some implementations. The prompt receiver 135 can collect or store records of player prompts (and in some implementations, conversation records including corresponding responses) in the storage 125 in one or more player profiles. In some implementations, the data processing system 105 can store and/or process the conversation to generate data of one or more training datasets 180 to improve the classification accuracy of one or more machine learning models.

The data processing system 105 can include the device communicator 140. The device communicator 140 can be or include any script, file, program, application, set of instructions, or computer-executable code that is configured to facilitate communication between the data processing system 105, the client system 115, and the machine learning system 120. The device communicator 140 can include hardware, software, or any combination. The device communicator 140 can facilitate communication between the data processing system 105, the network 110, the client system 115, and/or the machine learning system 120 via one or more communication interfaces. A communication interface can include, for example, an API compatible with components of the data processing system 105, the client system 115, or the machine learning system 120.

The device communicator 140 can support various communication protocols (TCP/IP, UDP) compatible with a particular component of the data processing system 105, a particular component of the client system 115, or a particular component of the machine learning system 120. The device communicator 140 can implement multiple communication interfaces, including web sockets or messaging protocols, to accommodate a range of client applications. The device communicator 140 can facilitate data transfer through techniques such as compression, encryption, and error correction, among others. The device communicator 140 can be compatible with diverse content items 175 and can be compatible with particular content delivery systems corresponding to particular content items 175, structures of data, types of data, or any combination thereof. For example, the device communicator 140 can be compatible with the transmission of text data or binary data structured according to one or more metrics or data of the application interface 185 or the client system 115. The device communicator 140 can provide the client system 115 with instructions to display different interactive player interface elements, including but not limited to content items 175, deep links 170, or any other interactive element described herein.

The data processing system 105 can include the model updater 145. The model updater 145 may be implemented, for example, in implementations where the language model 190 (or any other type of machine-learning model described herein) can be modified by the data processing system 105. For example, in some implementations the trainable parameters of the language model 190 may be executed by, maintained by, or otherwise accessible by the data processing system 105. In such implementations, the data processing system 105 may execute the model updater 145 to modify the trainable parameters of the language model 190 and/or generate one or more adapters for the language model 190 using one or more training datasets 180. In some implementations, the operations of the model updater 145 may be executed by, or executed in part by, the machine learning system 120. In such implementations, the data processing system 105 may transmit training examples of one or more training datasets 180 to the machine learning system 120, and/or identify an accessible network location for the training examples of one or more training datasets 180 to machine-learning system 120 to perform the operations of the model updater 145.

The model updater 145 can train, fine-tune, update, retrain, or otherwise maintain one or more machine learning models (e.g., the language model 190, etc.). The model updater 145 can include hardware, software, or any combination thereof. The model updater 145 can use various machine learning algorithms, including supervised learning techniques, to train/fine-tune/update one or more machine-learning models (e.g., the language model 190) using labeled data (e.g., one or more training datasets 180) to improve their prediction accuracy, classification capabilities, or to align their output with particular styles, structured output formats, or other types of output. In some implementations, the model updater 145 can implement unsupervised learning techniques, such as clustering and association rule mining, to identify patterns in unlabeled data, and/or to generate labels for said unlabeled data. In some implementations, the model updater 145 can implement reinforcement learning techniques to update the language model 190 based on player-provided feedback or examples in one or more training datasets 180.

The model updater 145 can update one or more machine learning models, including but not limited to the language model 190 or adapters therefor, using one or more training datasets 180. As described herein, each training example of a training dataset 180 can include an input context and a corresponding output message, which itself may include structured data corresponding to one or more wager opportunities 160, deep links 170, and/or formatting instructions 165. The input context can include data related to wager opportunities (e.g., search results, etc.), deep links (e.g., retrieved based on intent or search information), historical actions performed by one or more players, or any other relevant information described herein. The output message can define the response or outcome, such as text messages, recommendations, or formatting instructions 165 for displaying information, among any other data described herein. The configuration and training of the language model can include various training parameters, such as the learning rate, number of epochs, batch size, activation functions, and regularization techniques, to improve learning and prevent overfitting.

The model updater 145 can train/update/fine-tune the language model 190 or other machine learning components to generate structured data identifying the generation of one or more content items 175, to provide recommendations for wager opportunities 160, classify player intents, and generate natural language output in connection with structured output as described herein. The model updater 145 can implement various machine learning techniques, including supervised, unsupervised, and reinforcement learning, to continuously improve the performance of language model 190. In some implementations, the model updater 145 can provide instructions, training examples (e.g., from the training dataset(s) 180, etc.) to the machine learning system 120, to cause the machine learning system 120 to train/fine-tune/update the language model(s) 190 according to the techniques described herein. In some implementations, training/updating/fine-tuning the language model 190 can involve periodic retraining using updated datasets, incorporating additional linguistic data, and refining model parameters based on performance metrics, among others. The model updater 145 can leverage feedback mechanisms and adaptive learning strategies such that the language models 190 are aligned with evolving language patterns relating to wager opportunities 160, deep links 170, and/or live events (or information associated therewith).

In some implementations, the model updater 145 can use Low-Rank Adaptation (LoRA), Quantized Low-Rank Adaptation (QLoRA), or other adapters to train/update/fine-tune the language model 190. The model updater 145 can use LoRA to address the challenge of fine-tuning large models without updating all parameters. For example, instead of fine-tuning all the weights in the model, the model updater 145 can inject trainable low-rank matrices into each layer of the transformer architecture to reduce the number of trainable parameters or the computational load. In some implementations, the model updater 145 can extend LoRA by incorporating quantization techniques through QLoRA. For example, the model updater 145 can combine quantization with low-rank adaptation to reduce computational load. In some implementations, the model updater 145 can use prefix tuning, which adds trainable vectors to the input sequence to guide the model's attention. In some implementations, the model updater 145 can use p-tuning, which uses continuous prompts to fine-tune the model. In some implementations, the model updater 145 can use LongLoRA, a variant of LoRA, to manage longer sequences.

The data processing system 105 can include the profile manager 150. The profile manager 150 can be or include any script, file, program, application, set of instructions, or computer-executable code that is configured to create, modify, delete, or otherwise manage player profiles stored within the profile manager 150 or within the storage 125. The profile manager 150 can include hardware, software, or any combination. The player profiles can be associated with a user (referred to herein as a "player") of the client system 115 associated with a client device. The player profile of a player can be a user profile that includes information about the player and information about one or more of the client systems 115 used to access the data processing system 105 using the player profile. For example, the identifiers of the player profile can be used to access the functionality of the data processing system 105.

The identifiers can include a username, a password, an e-mail address, a phone number, a personal identification number (PIN), a secret code-word, and device identifiers for use in a two-factor authentication technique, among others. The player profile can store information about wagers, games, and live events that are performed by the player via the data processing system 105. The player profile can store a credit balance, wager information, or side wager information (e.g., an amount of a wager/side wager, a timestamp associated with a wager/side wager, information about gaming conditions or game state information that resulted in a side wager, a client device identifier of the client system 115 that was used to place the wager/side wager, etc.). The player profile can store information about the client system 115 used to access the data processing system 105, such as an IP address, a MAC address, a GUID, a player profile name (e.g., the name of a player of the client system 110, etc.), and a device name, among others. In some implementations, the player profile can be created by the data processing system 105 in response to the player profile creation request transmitted by the client system 115.

The profile manager 150 can store or otherwise maintain player information, including account details, preferences, and gaming history, among others. The profile manager 150 can generate profile information based on data received from the client systems 115. This configuration can allow the profile manager 150 to capture activity across different interactive applications and different devices, and store records of that activity in the player profile. The profile manager 150 can update credit balances, game statistics, and other relevant information based on the outcomes of games played by the client system 115. The profile manager 150 can receive data about game results from the client system 115 and use this information to make adjustments to the player profile. The profile manager 150 can store game statistics such as the number of wins, losses, and ties, as well as the player's average bet size, win percentage, and longest winning streak, among others. In some implementations, the profile manager 150 can store records of player interactions, including prompts, responses, or conversation histories, with the language model 190.

The data processing system 105 can include the intent classifier 155. The intent classifier 155 can be or include any script, file, program, application, set of instructions, or computer-executable code that is configured to determine the classification of the request included in a player input, referred to as a prompt. The intent classifier can include hardware, software, or any combination thereof. The intent classifier 155 can parse prompts received from the client system 115 to determine an intent of the prompts. For a given prompt, the data processing system 105 can use the intent classifier 155 to generate an input context for the language model 190 using the prompt and its classification. The input context can include a variety of information, such as prompts, questions, or previous parts of a conversation. The intent classifier 155 can identify the desired action or information sought by the player.

In some implementations, the intent classifier 155 can use rule-based techniques to identify player intents. For example, the intent classifier 155 can use a set of predefined rules or patterns that match specific prompts to predefined intents. In some implementations, the intent classifier 155 can use keyword matching or regular expressions to identify patterns that capture variations in prompts. For example, a rule can specify that a prompt related to placing a wager may indicate a betting intent. In some implementations, the intent classifier 155 can use machine learning models to identify a wider range of intents, including those that are context-dependent or ambiguous. For example, the intent classifier 155 can use implement vector machines (SVMs), naive bayes, or deep learning architectures such as recurrent neural networks (RNNs), or language models including transformer models such as BERT, DistilBERT, or generative pre-trained transformer (GPT)-based models. The models can be trained on large datasets of player prompts and their corresponding intents. The intent classifier 155 can use the machine learning model(s) to distinguish between player intents, such as checking odds, placing wagers, or requesting payouts, among other prompts.

The intent classifier 155 can process prompts to extract the underlying intent or purpose. The intent classifier 155 can categorize the player's prompt into specific intents, such as placing a bet, checking odds, or requesting information about a specific game or team, requesting information that may be provided via one or more application interfaces 185, among others. The intent classifier 155 can determine the actions to fulfill the player's request based on the classified intent. For example, if a player enters the prompt "What are the odds for Team A to win tonight?", the intent classifier 155 can determine that the prompt is a request for wagering information, identify the specific wager type as a moneyline bet, and extract relevant details such as the team's name (in this example, Team A) and the game timeframe (in this example, tonight).

In some implementations, upon receiving a prompt (e.g., a first prompt), the intent classifier 155 can process the input to identify the player's intent or an intended application interface 185, for example, by processing keywords, entities, or semantic meaning. In some implementations, where the intent classifier 155 cannot identify the application interface 185 based on the first prompt, the intent classifier 155 can provide an indication to the client system 115 that additional information is desired. The client system 115 can transmit a second prompt to the data processing system 105. The intent classifier 155 can process the first and second prompts to identify the intended application interface 185 or the player's intent. For example, if the first prompt reads "Odds for," and the second prompt reads "Team A baseball game tonight," the intent classifier 155 can determine that the player intends to request one or more wager opportunities 160 for tonight's baseball game for Team A.

In some implementations, the intent classifier 155 may execute the language model 190 to classify or otherwise determine the intent of the prompt. In such implementations, the language model 190 may generate structured output identifying a classification of the intent and one or more functions/actions/commands to be performed to satisfy the intent. The functions/actions/commands may include commands to search the wager opportunities 160 using one or mor corresponding values of the prompt to identify a relevant wager opportunity 160 to satisfy the prompt. The functions/actions/commands may include commands to search/identify one or more webpages, electronic documents, or content items 175 corresponding to one or more deep links 170 to satisfy the prompt. In some implementations, the functions/actions/commands may include indications that one or more aspects of the intent of the prompt cannot be classified. The aspects may be indicated, for example, in a natural language response message to the player that provided the corresponding input prompt.

In some implementations, based on the prompt or system-defined criteria, the intent classifier 155 can identify relevant wager opportunities from the storage 125. In some implementations, the intent classifier 155 can identify additional wager opportunities 160 (or data thereof) to combine with a candidate wager opportunity 160, for example, to generate a parlay wager opportunity 160. For example, the intent classifier 155 can identify potential legs for the parlay based on available betting options identified in the wager opportunities 160. In some implementations, the intent classifier 155 or the prompt receiver 135, depending on the implementation, can process player requests for payout information. For example, upon receiving a prompt about wager winnings, the intent classifier 155, via the data processing system 105, can cause the language model 190 to generate a data structure that includes the details of the payout based on the wager's outcome and odds. In some implementations, where the intent classifier 155 receives updates (e.g., updated odds for a specific wager), the intent classifier 155 can search through the wager opportunities 160 in the storage 125 to find the corresponding wager opportunity 160 based on identifiers (e.g., wager ID).

In some implementations, the data processing system 105, via the prompt receiver 135 or the intent classifier 155, can extract relevant keywords or metadata from the content items 175 to facilitate content discovery, for example, through search functionalities. When a player initiates a search via the application interface 185, the data processing system 105 can process the prompt and retrieve the relevant content item by matching keywords, embeddings, or other data extracted/generated from the prompt with corresponding keywords, embeddings, or other data stored with the content item. The intent classifier 155 can generate an input context for the language model 190. The data processing system 105 can transmit the input context to the language model 190, which can generate data structures corresponding to the content items.

The client system 115 can execute an application that communicates with the data processing system 105. The application can present one or more application interfaces 185. The application interface 185 can include one or more user interfaces that include interactive elements, wager opportunities, information relating to player prompts/requests, or other information described herein. Players can input information, view content, or initiate actions through the application interface 185. In some implementations, the application interface 185 can be associated with a particular client application that communicates with the data processing system 105. In some implementations, different application interfaces 185 can correspond to different deep links 170. The deep links 170, when interacted with via the application, can cause the application to navigate to the corresponding application interface 185. In some implementations, the client application can include a web application, a server application, a resource, a desktop, or a file. In some implementations, the client application can include a local application (e.g., local to a client system 115), a hosted application, a software-as-a-service (SaaS) application, a virtual application, a mobile application, and other forms of content. In some implementations, the client application can include or correspond to applications provided by remote servers or third-party servers.

The application interface 185 can include graphical user interfaces or graphical elements that present content items 175, interactive elements, or wager recommendations 160. The application interface 185 can receive interactions from the player, such as selections of wagers to be placed through the application interface 185. In response to receiving the interactions, the client application presenting the application interface 185 can communicate with the data processing system 105 to execute the placement of wagers. In some implementations, the application interface 185, via the client system 115, can cause the data processing system 105 to update the storage 125 to include the details of the wager counts. In some implementations, upon interaction with a graphical element, the application interface 185, via the data processing system 105, can cause the profile manager 150 to update a player profile associated with the client system 115 according to the wager placed.

The client communicator 195 within the client system 115 can be similar to, and include any of the structure and functionality of, the device communicator 140 described in connection with the data processing system 105. For example, the client communicator 195 within the client system 115 can communicate with the data processing system 105 via the network 110 using one or more communication interfaces to carry out the various operations described herein. The client communicator 195 can be compatible with particular content objects and can be compatible with particular content delivery systems corresponding to particular content objects, structures of data, types of data, or any combination thereof.

The machine learning system 120 can include the language model 190. The language model 190 can be trained on text data. For instance, the language models 190 can be trained/updated/fine-tuned to perform a variety of text processing tasks, including, but not limited to, generating text, formatting instructions 165, comprehending and processing natural language input, and responding to queries with contextually relevant information. The language model 190 can include a transformer architecture, such as a generative pre-trained transformer (GPT) architecture. The transformer architecture can include an encoder that can process the input text and a decoder that can generate the output text. The language model 190 can include multiple layers that can operate to process and generate text. For example, embedding layers can convert words or tokens into dense vectors of fixed size, attention layers can use mechanisms such as self-attention to weigh the importance of different tokens in a sequence, and feedforward layers can apply transformations to the data to learn complex patterns. In some implementations, the language model 190 can use a self-attention mechanism to weight different parts of the input sequence when generating predictions. The language model 190 can be trained/fine-tuned/updated on vast datasets (e.g., one or more training datasets 180, etc.), for example, generated or updated by the model updater 145 using different learning techniques, as described herein. The language model 190 may be pre-trained using large corpuses of natural language text data, such that the language model 190 can efficiently process and provide output corresponding to natural language input.

Natural language input can have a syntactic structure in which individual words, collections of words (e.g., phrases), or relative positions of words (e.g., word order) can indicate specific meanings. The language model 190 can be trained/updated/fine-tuned to parse sentences into their grammatical components to understand the structure and relationships between words. The language model 190 can use phrasing structure rules that define how words combine to form phrases and sentences. The language model 190 can receive an input context, which can include a sequence of tokens and/or text data structured in a format compatible with an input layer of the language model 190. In some implementations, the language model 190 may include or may be associated with a tokenizer model, which can convert a text-based or media-based input context into a sequence of tokens compatible with an input layer of the language model 190. The input context may include natural language, structured data, or combinations thereof, and may specify instructions for the model to generate particular output (e.g., formatting instructions 165, etc.) according to the techniques described herein.

The language model 190 can receive an input context generated via the intent classifier 155. As described herein, the input context can include relevant wager opportunities 160 identified based on the prompt. The data processing system 105 can transmit the input context to the language model 190. The machine learning system 120 can execute the language model 190 to process the input context. The language model 190 can generate an output data structure including one or more tokens representing an output message generated based on the input context. In some implementations, tokens or combinations of tokens can indicate special control data for the language model, including but not limited to the beginning/end of formatting instructions 165, the beginning of prompts/natural language text, or the beginning/end of wager opportunities, deep links 170, or any other type of data described herein.

The language model 190 can process a wide range of input formats, including but not limited to text, audio, images, video, or other modalities. In some implementations, based on the input context, the language model 190 can generate output, which can range from simple text responses to complex data structures (e.g., the formatting instructions 165), or combinations thereof. In some implementations, the language model 190 can use the input context to iteratively predict the next token word or phrase to generate responses in response to input contexts. Tokens may include a numerical representation of text data, function calls, special separators/control signals, or any other data described herein. In some implementations, the language model 190 can generate instructions or commands that automatically invoke tools or functions to perform specific tasks or operations.

In some implementations, the language model 190 can generate a data structure and/or formatting instructions 165 that define the visual attributes of graphical elements. The data structure can include details such as text content, layout specifications, visual or graphical elements, and other interactive components. In some implementations, the language model 190 can generate a data structure, including details or instructions for generating a graphical element that displays wager recommendations or other relevant information. In another example, the language model 190 can generate a data structure having instructions to present statistics or details relating to one or more live events. Such data structures can include details such as chart type, data points (e.g., team names, odds), axes labels (e.g., teams, scores, etc.), and formatting details (colors, fonts, sizes), which can be used to visualize real-time data or near real-time data from live events. The data structure can be parsed by the client system 115 to generate the visual representation of graphical elements. In some implementations, the language model 190 can generate data structures that include instructions for generating interactive elements such as hover effects, tooltips, or clickable regions. In some implementations, the language model 190 can adapt the generated data structure to accommodate specific player preferences for the visual representation.

In some implementations, based on the prompt or player intent, the language model 190 can receive input contexts from the data processing system 105 in various formats, such as text, JSON, or structured data. The language model 190 can process the input context to determine a desired output or action. In some implementations, the language model 190 can generate a data structure defining a graphical element, including properties such as type (button, menu, image), content, layout, and interactive behaviors, among others. In some implementations, the data structure can include metadata specifying the target application interface 185 to be navigated to upon interaction with the graphical element. The client system 115 can parse the received data structure and present the corresponding graphical element via the application interface 185. In some implementations, where a player interacts with the graphical element, for example, representing a wager recommendation, the data processing system 105 can update the associated player profile accordingly.

In some implementations, the language model 190 can generate data structures corresponding to the textual content associated with a wager, such as descriptions, explanations, or promotional materials. The textual content can be incorporated into larger content items 175 or displayed independently. In some implementations, the language model 190 can include additional wagers in the data structure. The language model 190 can receive the additional wagers via the input context. The data structure can include details regarding the wager type (e.g., moneyline, point spread, parlay) and relevant details, such as teams, odds, and bet amounts. In some implementations, the language model 190 can generate an additional data structure or update an existing data structure in response to receiving an input context that includes updated information, such as new odds for a specific wager. The data structure can include a timestamp indicating when the update occurred and a list of changes. For example, each change can specify the field that was modified. The language model 190 can transmit the updated data structure, including the updated wager data, to the client system 115 via the data processing system 105.

In some implementations, where the client system 115 is associated with a player profile, the data structure generated by the language model 190 can include instructions to generate an interactive element that, when interacted with, can cause the client system 115 to transmit a request to the profile manager 150 to update the player profile based on, for example, wager recommendations. In some implementations, the language model 190 can process input contexts for payout information. For example, upon receiving an input context about wager winnings, the language model 190 can generate a data structure, including the details of the potential payout based on the wager's outcome and odds. The client system 115 can parse the data structure and present the information along with any relevant details via the application interface 185.

In some implementations, the language model 190 can generate a data structure that includes formatting instructions 165 and/or other data that may indication how a content item 175 is to be generated. The client system 115 can parse the data structure to generate portions of the text or relevant elements. In some implementations, the data structure can correspond to text content associated with a wager, which can include references to specific entities or actions within the application interface 185. In some implementations, the data structure can correspond to deep link opportunities associated with the content items 175 or text content. For example, for each identified opportunity, the language model 190 can generate a deep link URL or identifier that corresponds to a specific target within the application. The generated deep links can be embedded within the text, often as clickable links or hyperlinks.

In some implementations, the language model 190 can generate formatting instructions 165 for content items 175 that present wager opportunities. The content items can include candidate prompts or interactive elements. For example, the content item can indicate adding a specific team to an existing parlay wager. Based on player preferences and the current content items, the data processing system 105 can generate input contexts for the language model 190 to incorporate wagers into the text data of the content items 175. Player interactions with content elements 175, such as taps, clicks, or hovers, can be captured by the client system 115 and transmitted, via the client system 115, to the data processing system 105. The data processing system 105 can process the interaction to generate additional input contexts for the language model 190. For example, upon receiving the input context, the language model 190 can generate a data structure corresponding to the additional content items. In some implementations, the language model 190 can generate data structures corresponding to dynamic content items 175, including descriptive text to accompany images.

In some implementations, the data processing system 105 can execute the language model 190 as a component. In some implementations, the data processing system 105 can select one of a set of language models 190 to use in connection with the techniques described herein based on different factors, including but not limited to computational complexity, efficiency, and task-specific capabilities, among other attributes. The data processing system 105 can use data cleansing, model-specific tokenization, or other standardization techniques to maintain compatibility with the language model 190. In some implementations, the data processing system 105 can implement batch processing, data streaming, or asynchronous data management techniques to manage data flow into the language model 190. In some implementations, where the data processing system 105 is using an API to access the functionality of the language model 190, the data processing system 105 can integrate API calls into its operational workflow to carry out any tasks described herein. In some implementations, where the data processing system 105 is deploying the language model 190 on local infrastructure, the data processing system 105 can load the language model 190 into system memory. The data processing system 105 can format incoming data to match the input structure of the language model 190.

B. Systems and Methods for Generating Formatting Instructions For Wagers

Figure 2:
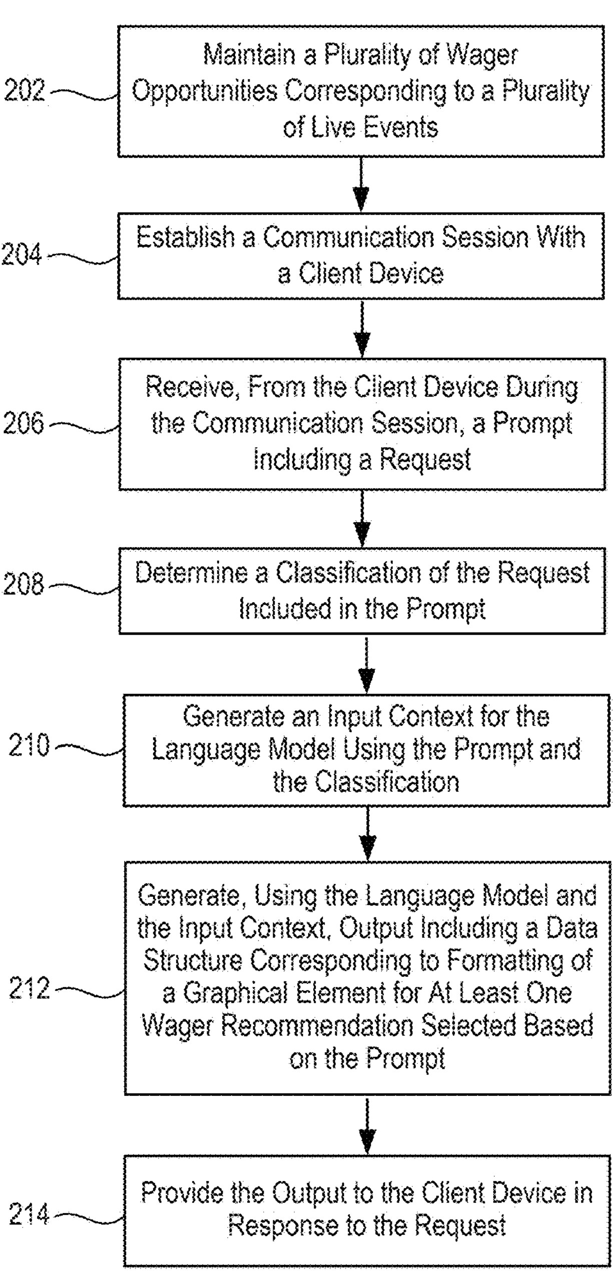
FIG. 2 illustrates an example flow diagram of a method for generating formatting instructions for wagers, in accordance with one or more implementations.

Referring now to FIG. 2, depicted is an illustrative flow diagram of a method 200 for generating formatting instructions for wagers. The method 200 can be executed, performed, or otherwise carried out by an interactive server or a system. A data processing system (e.g., the data processing system 105) can be remote to one or more client systems (e.g., the client system 115) and one or more machine learning systems (e.g., the machine learning system 120) and can communicate with the one or more client systems or the one or more machine learning systems via a computer network (e.g., the network 110). In a brief overview of method 200, the data processing system can maintain a plurality of wager opportunities corresponding to a plurality of live events (STEP 202), establish a communication session with a client device (STEP 204), receive, from the client device during the communication session, a prompt for a language model including a request (STEP 206), determine a classification of the request included in the prompt (STEP 208), generate an input context for the language model using the prompt and the classification (STEP 210), generate, using the language model and the input context, output comprising a data structure corresponding to formatting of a graphical element for at least one wager recommendation selected based on the prompt (STEP 212), and provide the output to the client device in response to the request (STEP 214).

In further detail of method 200, the data processing system can maintain a plurality of wager opportunities (e.g., wager opportunities 160) corresponding to a plurality of live events (STEP 202). Each wager opportunity can correspond to a predefined wager type. The data processing system can generate and manage a collection of wager opportunities. The wager opportunities can correspond to one or more live events. Examples of wager opportunities can include Team A to win a live event, Team B to score more than a predetermined number of points during a live event, total points scored over/under X points, or Player C to score over X points, among others. Other types of wager opportunities may also be stored/maintained by the data processing system, including one or more multi-game parlay wagers, single-game parlay wagers, multi-d The data processing system can establish a communication session with a client device (STEP 204). The client device can be associated with a client system. A session can refer to a conversational interaction between a player and the data processing system. A session can be initiated when a player accesses a client application via the client device. Each session can be identified and tracked. In some implementations, a communication session can include any number of prompts and responses exchanged between the player and the data processing system. A player may provide one or more prompts for transmission to the data processing system via input to a graphical user interface of the application. For example, upon a player interaction with an interactive element presented by an application, such as clicking a button or entering text, a prompt can be generated and added to the conversation record associated with the session. The data processing system can process the prompt and generate a corresponding response, which can be appended to the conversation record of the communication session. In some implementations, the data processing system can establish a communication session with the client device using various protocols, such as HTTP, WebSocket, or other network-based communication methods. The connection can allow for the exchange of data and messages. The data processing system can identify or record the specific client device engaged in the communication session, as described herein.

The data processing system can receive, from the client device during the communication session, a prompt for a language model including a request (STEP 206). The prompt may include any type of natural text input and may specify a player's initial request related to wagering. In some implementations, the prompt can include one or more requests for a wager on a specific outcome, such as a team to win, a player to score, or a specific point spread. In some implementations, the prompt can include inquiring about odds for different wager types on a particular event. In some implementations, the prompt can include seeking suggestions for potential wagers based on player preferences or available options, requesting to add, remove, or modify wagers on a bet slip, and inquiring about account balance, wager history, or transaction details, among others. In some implementations, the data processing system can manage subsequent prompts or requests for modifications. For example, a player can request an update to a previously generated wager recommendation or seek additional information about a specific wager. The data processing system can process the secondary prompts in conjunction with the original request to transmit relevant and updated information.

In some implementations, the data processing system can track the number of times a particular wager has been placed. As players place wagers, the data processing system can increment a wager counter within the storage. In some implementations, the data processing system can track changes in wager odds such that the data synchronization can be maintained in real time. In some implementations, the data processing system can process the wager request and update the associated player profile, which may include recording the wager details, calculating winnings or losses, adjusting the player's account balance, and more. In some implementations, when the player ends the session by logging out or closing the application, the data processing system can store relevant session data such as player preferences, betting history, and cart items in the profile manager for future use.

The data processing system can determine a classification of the request included in the prompt (STEP 208). The data processing system can process the player's prompt to determine the player's intent or intended action. The data processing system can assign a specific wager type to each wager opportunity to categorize the wager opportunities. The wager types can include moneyline (betting on which team will win the game), point spread (betting on the margin of victory for one team), over/under (betting on the combined total points scored by both teams), player props (betting on the performance of individual players), parlay (combining multiple bets into a single wager), and single bet, among others. In some implementations, the classification process can include identifying the wager type (e.g., moneyline, point spread, parlay, etc.) and relevant entities (e.g., teams, players, etc.) within the prompt.

The data processing system can generate an input context for the language model using the prompt and the classification (STEP 210). The data processing system can process the prompt and its associated classification and can generate an input context, for example, by performing any of the operations described herein in connection with the intent classifier. The input context can indicate the classified intent of the prompt, including information relating to one or more target outcomes for the prompt, such as placing a bet or getting information. In some implementations, the input context can specify the wager type and include relevant entities, such as teams or players. In some implementations, the input context can include contextual information relevant to the player's request. For example, if a player enters the prompt "Bet $100 on Team A to win," the input context can include the intent to place a bet, wager type as moneyline, team as Team A, and the bet amount as $100, providing structured information to the language model to generate the output in accordance with the input context.

Generating the input context may include retrieving wager-related data for inclusion in the input context. For example, the data processing system may execute one or more searching operations to identify relevant wager opportunities (e.g., wager opportunities 160) for inclusion in the input context. In some implementations, data can be extracted from each wager opportunity and included in the input context in a structured format. In one example, the wager opportunity data may be provided in a JSON format, an XML format, or any other structured format. In some implementations, the input context may be generated to include special characters, tokens, or other data indicating portions of the input context that are dedicated to system prompts, player-provided prompts, wager opportunity data, or other data described herein. In some implementations, the input context may include portions of formatting data, which the language model (e.g., language model 190) can use to generate formatting instructions for particular wagers or otherwise provide structured output that may be accessed by the client device to display one or more content items corresponding to wagers.

The data processing system can generate, using the language model and the input context, output including a data structure corresponding to formatting of a graphical element for at least one wager recommendation selected based on the prompt (STEP 212). Upon receiving a prompt, whether initial or subsequent, the data processing system can generate the input context for the language model, as described herein. The data processing system can provide the input context to the language model for processing, which may include transmitting the input context to a machine learning system (e.g., the machine learning system 120) via one or more API calls. In some implementations, the data processing system can cause the machine learning system to execute the language model using the one or more API calls. The input context can provide information for the language model to generate a data structure corresponding to the input context. The content can be formatted into a data structure suitable for display on the client device. The data structure can include details about the wager, odds, or any relevant graphical elements.

In some implementations, the input context can include a flag or identifier that indicates that the wager is a parlay. The language model can incorporate the input context into the data structure, for example, to indicate whether the recommendation is a parlay wager. In some implementations, if the generated wager recommendation is a parlay, including three legs, the data structure can include a field with the value parlay and a list of the individual legs of the parlay. Each leg of the parlay may be or include a corresponding identifier, which may point to a corresponding wager opportunity maintained by the data processing system as described herein. In some implementations, the data structure generated for a wager recommendation can correspond to interactive elements within an application interface, such as buttons, links, or other interactive components. In some implementations, the language model can generate data structures corresponding to the payout information calculated by the data processing system. The language model can generate data structures that include instructions for generating textual explanations, visual representations, or other graphical elements.

In some implementations, the data structures associated with a wager recommendation can include details regarding a counter to track the number of times a particular wager has been placed. As players place wagers, the data processing system can increment the wager count for the corresponding wager opportunity. The number of players that placed a wager using the corresponding wager opportunity may be displayed in connection with the wager opportunity via the client device(s) described herein. The recommended wager opportunity may also indicate odds information relating to the wager opportunity. The odds information may be updated in real-time or near real-time based on changes in odds detected by the data processing system and/or the client device. The data structures generated using the language model may be identified using corresponding special character, symbol, or control tokens. Such tokens may be detected and extracted by the data processing system and/or the client device to facilitate generation of the graphical components (e.g., content items 175) described herein.

The data processing system can provide the output to the client device in response to the request (STEP 214). The data processing system can transmit the data structure generated by the language model to the client system, for example, over the network. The data structure can include information about the wager, odds, or any relevant graphical elements. The client system associated with the client device can parse the data structure and render it as an application interface element. In some implementations, the client system can cause the application interface to generate multiple graphical elements and display different visual representations of wagering options. In some implementations, the client system can dynamically update the graphical elements based on updated data received or retrieved from the data processing system. For example, the application executing on the client device can receive updated odds information relating to one or more live events or wager opportunities corresponding thereto. Upon receiving updated odds information, the application can dynamically update the graphical elements to indicate the updated odds information. An example of such an interface element is displayed in connection with FIG. 7A.

In some implementations, the data processing system can manage player interactions. For example, when a player interacts with an interactive graphical element at the client device, the client device can transmit an indication of the interaction to the data processing system. The data processing system can receive the interaction from the client system, which can indicate the player's intent to perform a specific action. Based on the player's interaction, the data processing system can update the player profile. In some implementations, when a player interacts with the graphical element representing a wager, such as clicking the place wager button, the data processing system can process a wager placement request. Upon wager placement, the data processing system can update the player profile associated with the client device to indicate the new wager and its outcome. In some implementations, the data processing system can process requests for payout information. For example, when a player, via the client device, requests information relating to a potential payout for a specific wager (e.g., given a particular input payment amount or otherwise), the data processing system can retrieve the information relating to wager opportunity, and use the language model to calculate the potential payout based on the associated odds indicated in an input context, in some implementations. In some implementations, based on player interactions, the data processing system can update the player profile with relevant information, such as wager history, betting preferences, or account balance, among other details.

Figure 7A:
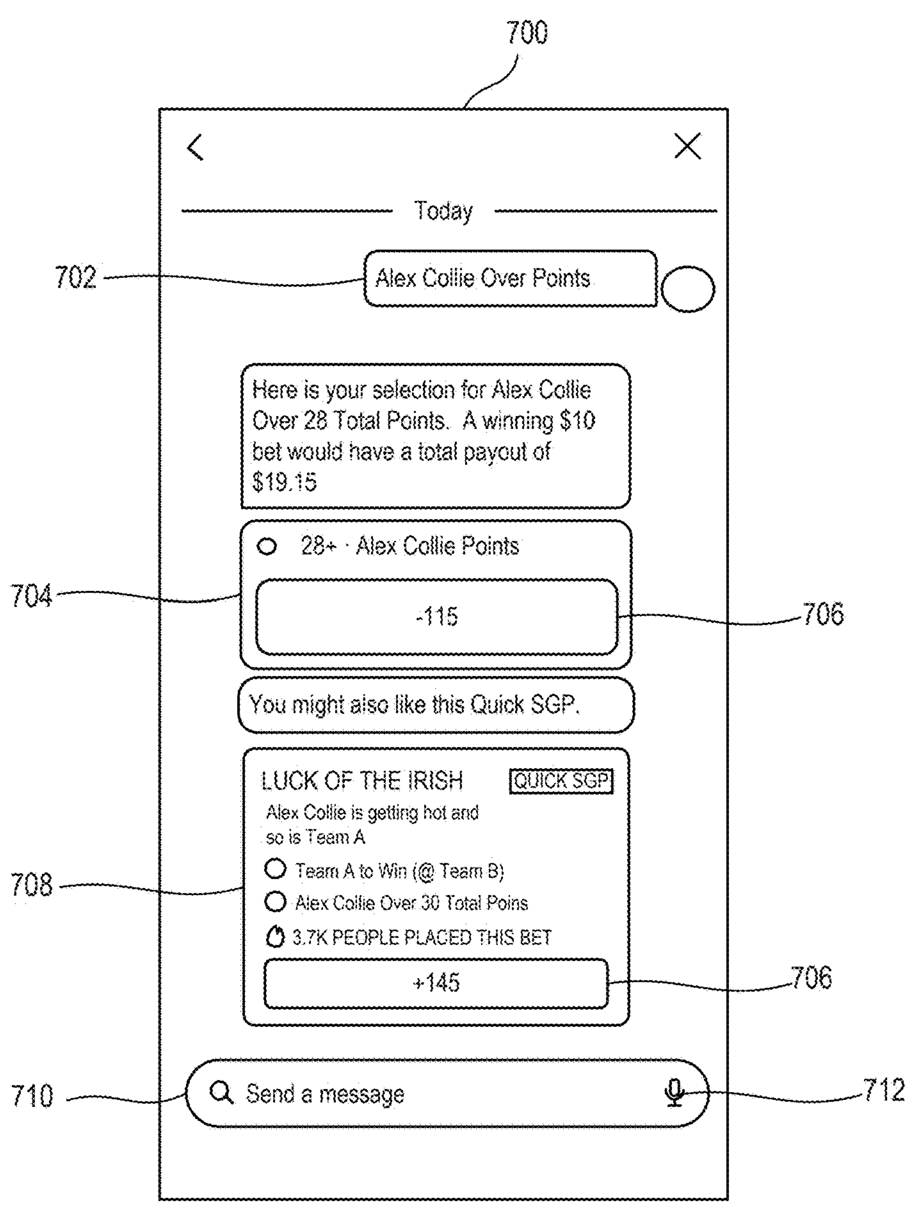
FIGS. 7A-7C illustrate an example implementation of an application interface in connection with FIG. 2, in accordance with one or more implementations.

Referring now to FIG. 7A, depicted is an example implementation of an application interface, as described in connection with FIG. 2. As shown, a graphical user interface 700 can display a prompt 702 based on a player's interaction with a message bar 710. The prompt 702 can be an initial prompt or search term entered by the player via the message bar 710. The message bar 710 can be used to input text or initiate voice commands for sending prompts 702. For example, players can type their message directly into the designated text box within the message bar 710, or they can use a microphone icon 712 to dictate their prompts. In this example, the prompt 702 reads "Alex Collie Over Points", indicating a request for a wager opportunity related to Alex Collie scoring more than a certain number of points.

The data processing system 105 can receive text data entered into the prompt 702 as a prompt from the client system 115 over the network 110. The data processing system 105 can determine the classification of the intent of the request included in the prompt 702, such as identifying the desired wager type and relevant player or team. The data processing system 105 can generate an input context for the language model 190 based on the classified prompt. The language model 190 can process the input context (which can include the prompt, identified wager opportunity data, etc.) to generate a data structure corresponding to one or more wager opportunities. For example, the data structure can include information such as the wager type, participants, and relevant metrics, among others. The client system 115 can parse the data structure to display a specific wager option 704 via the graphical user interface 700, such as "Alex Collie Over 28 Total Points", along with an additional output such as "Here is your selection for Alex Collie Over 28 Total Points. A winning $10 bet would have a total payout of $19.15". The graphical user interface 700 can display the odds 706 associated with the generated wager option 704. The odds 706 can indicate betting dynamics. For example, negative odds, such as −115, can indicate that the player is to wager $115 to win $100, and positive odds can indicate the potential winnings from a $100 wager.

In some implementations, the language model 190 can generate an additional data structure using information corresponding to the wager opportunity indicated in the input context. For example, the language model 190 can generate the data structures corresponding to a same-game parlay (SGP) wager type. The client system 115 can parse the additional data structure to extract specific wager options and the associated information, which may include identifiers of individual legs, odds information associated with each leg, an order of one or more legs, or other wager-related information. For example, upon parsing the additional data structure, the client system 115 can display a Quick SGP 708 via the graphical user interface 700. The Quick SGP 708 can include a parlay wager opportunity 160, which can be related to the input prompt and selected for inclusion in the input context as described herein. The Quick SGP 708 can include bets such as the Team A winning their game against the Team B and Alex Collie scoring over 30 total points in that game. The Quick SGP 708 can display a counter indicating the number of players who have placed the wager, which may be dynamically updated as described herein. The Quick SGP 708 can display the odds 706 associated with the parlay, for example, at +145. The Quick SGP 708 can be an interactive element that, when interacted with, causes the data processing system 105 to update the player profile associated with the client system 115.

Figure 7B:
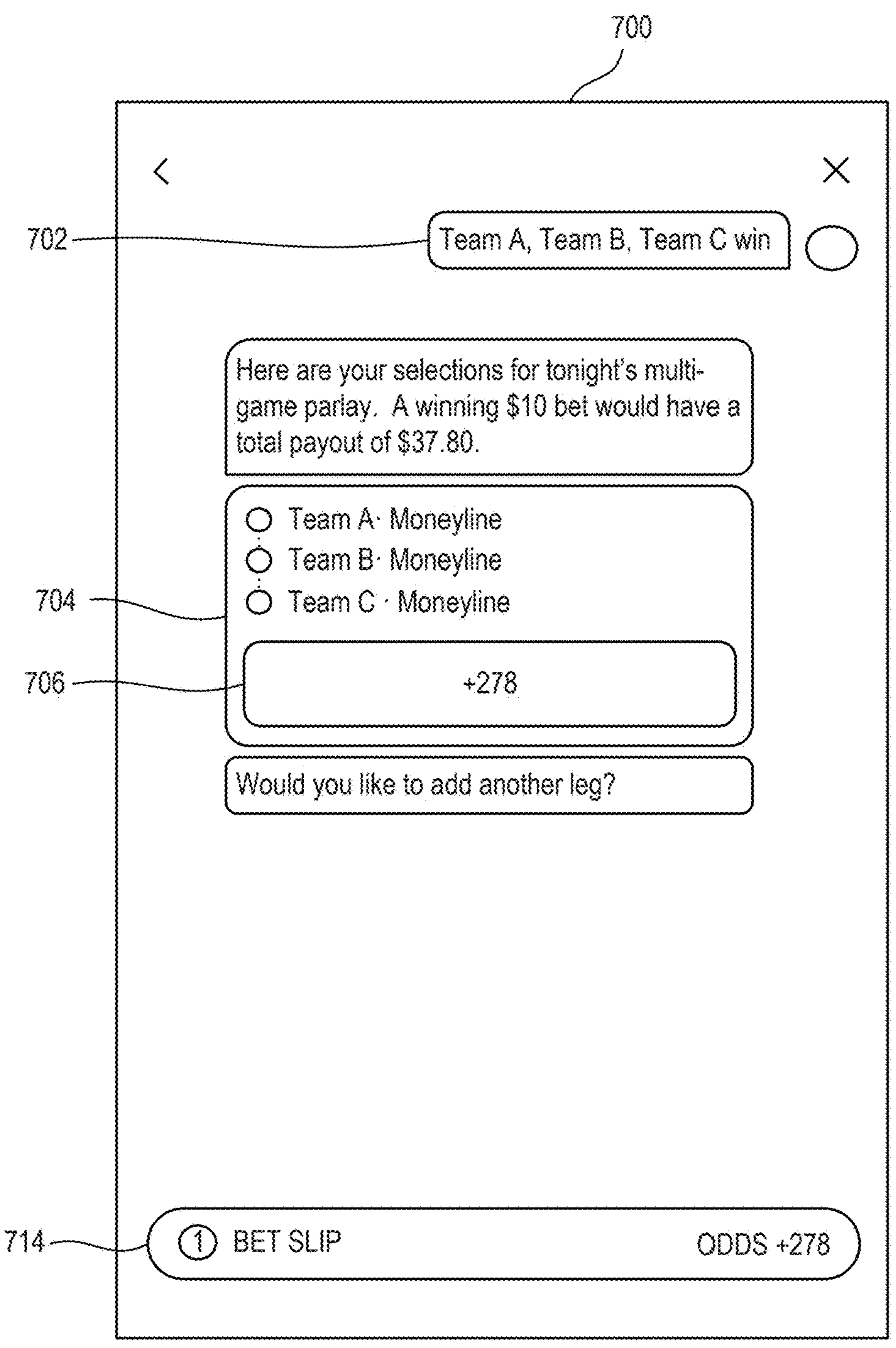

Referring now to FIG. 7B, depicted is another example implementation of an application interface, as described in connection with FIG. 2. The application interface 185, via the graphical user interface 700, can allow a player to generate wagers based on general preferences. For example, a player can input a general wager request via an input text field, as described herein. The graphical user interface 700 can present the initial prompt 702. In this example, the prompt 702 reads "Team A, Team B, Team C win", indicating a request for a parlay wager involving different three teams to win. The data processing system 105 can process the prompt 702, as described herein, to determine the desired wager type and relevant teams. Based on the classification, the data processing system 105 can generate an input context for the language model 190. The language model 190 can process the input context and generate data structures corresponding to a specific wager, which in this case is a parlay including each of the requested teams as a respective leg.

For example, the data structure can include details about the wager, including the names of the teams, the wager types (e.g., moneyline), and the odds for each leg of the parlay. The client system 115 can parse the data structure to extract relevant wager details. Extracting the data structure may include parsing special characters, tokens, or other structured data to identify portions that are to be formatted into an interactive graphical element and the format thereof. For example, as shown, the client system 115 can display, via the graphical user interface 700, a wager option 704, along with an additional output such as "Here are your selections for tonight's multi-game parlay. A winning $10 bet would have a total payout of $37.80". The wager option 704 can include the calculated odds 706 for the entire parlay. In some implementations, the language model 190 can incorporate information regarding bet slips into the data structure based on the prompt field 702 and input context. In this example, the player has added the respective wager to their bet slip by interacting with the wager option 704. The bet slip button 714 is shown as including the associated odds of the wager opportunities added to the bet slip. The bet slip button 714 can be an interactive button that, when interacted with, causes the data processing system 105 to display a bet slip interface, enabling a player to confirm wager opportunities and wager amounts associated therewith.

Figure 7C:
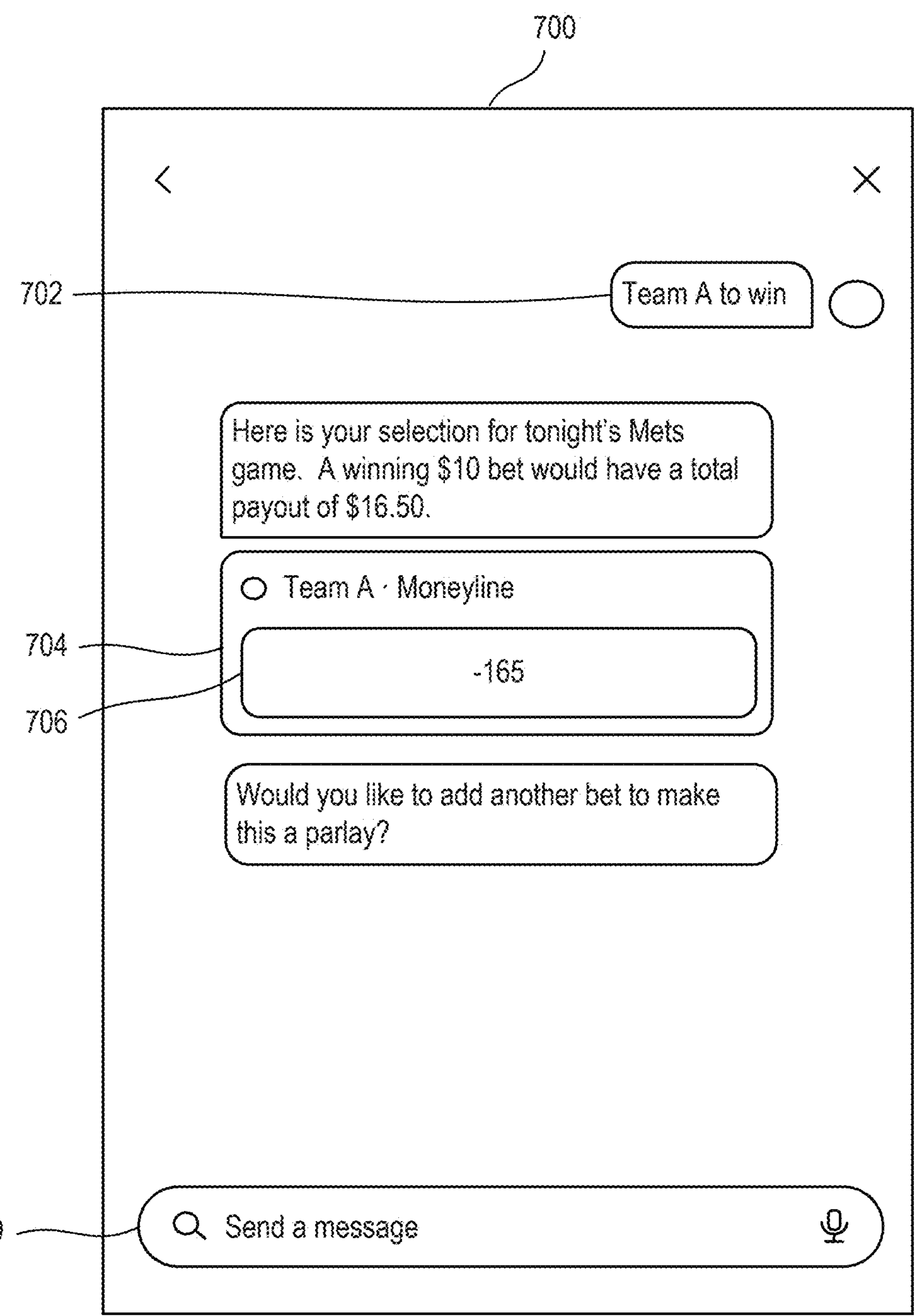

Referring now to FIG. 7C, depicted is another example implementation of an application interface, as described in connection with FIG. 2. In this example, a player has provided a enter a prompt indicating interest in a specific team via the message bar 710, as described herein. The graphical user interface 700 can display the prompt field 702. In this example, the prompt field 702 reads "Team A to win". The data processing system 105 can process the prompt field 702 to determine the desired wager type (e.g., moneyline in this case) and the target team (e.g., Team A). Based on the classification, the data processing system 105 can generate an input context for the language model 190. The language model 190 can process the input context and generate data structures, including relevant wager details. For example, the data structure can include information such as team names, wager types, wager opportunity identifier(s), odds information, live event identifier(s), or counter values, among other data described herein. The client system 115 can parse the data structure, and generate and display the wager option 704 via the graphical user interface 700 using the information extracted from the data structure. The wager option 704 can include the team's name (in this example, Team A), bet type (in this example, moneyline), and corresponding odds 706 (in this example, 165).

C. Systems and Methods for Generating Instructions to Display Deep Links

Figure 3:
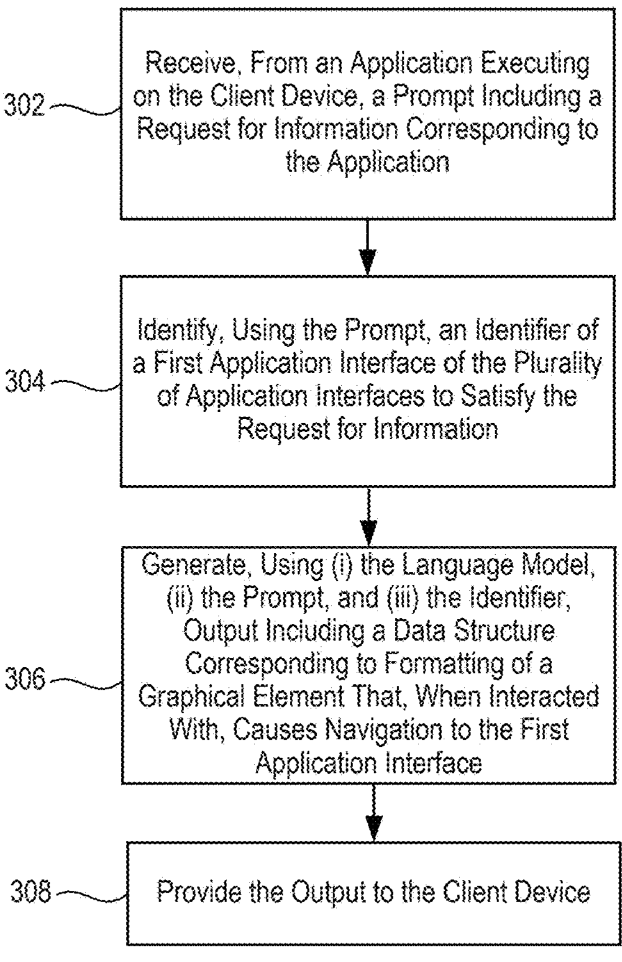
FIG. 3 illustrates an example flow diagram of a method for generating instructions to display deep links, in accordance with one or more implementations.

Referring now to FIG. 3, depicted is an illustrative flow diagram of a method 300 for generating instructions to display deep links. The method 300 can be executed, performed, or otherwise carried out by an interactive server or a system. A data processing system (e.g., the data processing system 105) can be remote to one or more client systems (e.g., the client system 115) and one or more machine learning systems (e.g., the machine learning system 120) and can communicate with the one or more client systems or the one or more machine learning systems via a computer network (e.g., the network 110). In a brief overview of method 300, the interactive server or the system can receive, from an application executing on the client device, a prompt including a request for information corresponding to the application (STEP 302), identify, using the prompt, an identifier of a first application interface of the plurality of application interfaces to satisfy the request for information (STEP 304), generate, using the language model, the prompt, and the identifier, output including a data structure corresponding to formatting of a graphical element that, when interacted with, causes navigation to the first application interface (STEP 306), and provide the output to the client device (STEP 308).

In further detail of method 300, the data processing system can receive, from an application executing on the client device, during a communication session, a prompt for a language model including a request for information corresponding to the application (STEP 302). The application can be a standalone application or a native application. In some implementations, the application can be a web application accessed through a web browser. As described herein, the application can initiate a communication session with the data processing system, which can include establishing a network connection or using an existing connection between the data processing system and the client device to access functionality of one or more language models.

The application can provide a prompt to the data processing system based on player input, as described herein. The prompt can be a natural language request or query for information, an application interface, or data maintained by the data processing system. The application can transmit the generated prompt to the data processing system through the established communication channel. In some implementations, the data processing system can receive and store records of multiple prompts in association with an identifier of the communication session.

The data processing system can identify, using the prompt, an identifier of a first application interface of the plurality of application interfaces to satisfy the request for information (STEP 304). The first application interface can sometimes be referred to herein as the target application interface. Upon receiving the prompt, the data processing system can process the prompt to identify the target application interface. This may include classifying the intent of the prompt as a request for information, and can include performing a search of a database of application interfaces, web pages, or other information resources maintained by the data processing system. For example, the data processing system can execute a semantic searching process or a key word-based searching process (or combinations thereof) to identify one or more relevant information resources.

In some implementations, the data processing system can determine that the prompt is insufficient to determine a target application interface. For example, the data processing system can determine that the prompt lacks details to identify the target application interface. This may be based on a search of the application interfaces, web pages, or other information failing to return results, or returning results with a match score or relevance score that fails to satisfy one or more thresholds. The data processing system can provide feedback to the client system associated with the client device, indicating that the data processing system cannot identify the target application interface based on the given prompt. The client system can provide feedback to the player and receive further details or clarification regarding their request based on the second prompt, for example. The client system can transmit the subsequent prompt or the second prompt to the data processing system. The data processing system can process the original and subsequent prompts to extract relevant information. For example, based on the combined prompts, the data processing system can extract relevant information about the desired wager type, teams, and specific betting options, among others.

In some implementations, the data processing system can process multiple prompts, using the intent classification techniques and searching techniques described herein, to identify the target application interface. For example, the data processing system can extract key terms and entities and identify patterns and relationships between the prompts to infer player intent. In some implementations, the data processing system can compare the extracted information against the characteristics of the available application interfaces using any suitable searching technique. In some implementations, embeddings for content of one or more application interfaces may be stored in a vector database in association with identifiers of corresponding application interfaces, and the data processing system can execute a vector searching process over the vector database to identify the target application interface(s). In some implementations, the data processing system can assign an identifier to the interface that best matches the player's prompt, for example, based on relevance scores determined according to L1 norm, L2 norm, cosine similarity, or any other comparison metric.

The data processing system can generate, using (i) the language model, (ii) the prompt, and (iii) the identifier, output including a data structure corresponding to the formatting of a graphical element that, when interacted with, causes navigation to the first application interface (STEP 306). As described herein, an input context for the language model can be generated to include the prompt and identifier in a data structure in a format compatible with the input layer of the language model. In some implementations, the input context can include additional information corresponding to the target application interface, including but not limited to system prompt data, content data (e.g., text data), image data (e.g., thumbnail images), relevance score data (e.g., from a searching process), or any relevant metadata associated with the target application interface. The language model can generate data structures that include formatting instructions for generating text, images, or other graphical elements that indicate an identifier of the target application interface.

In some implementations, the data structure can include formatting instructions for generating interactive elements, such as links (e.g., uniform resource identifiers (URIs), uniform resource locators (URLs), etc.), buttons, or other interactive graphical user interface elements. The formatting instructions may include formatting templates, or data structures that indicate how information relating to the target application interface is to be presented. Interactions with the interactive elements corresponding to the target application interface can cause the application executing on the client device to the navigate to the target application interface. For example, or more hyperlinks can provide navigation to other sections or components within the same application. For example, in the context of a betting platform, an internal deep link can direct players to a specific wager type or a detailed view of a live event, or another native application interface of the application executing on the client device. In some implementations, external links can direct players to external websites, or external deep links may cause execution of one or more second applications stored at the client device. In some implementations, links or interactive elements corresponding to the target application interface may trigger specific actions within the application, such as placing a wager, updating account settings, or contacting customer support. The link structure can include link text, link target, and link attributes, image/thumbnail data, among others. The link text can include text or an image indicating the link's destination. The link target can include a specific page, section, or action associated with the link. The link attributes can include additional properties, such as styling, target window, or tracking URI/URL parameters.

The data processing system can provide the output to the client device (STEP 308). As explained above, the data processing system can transmit the formatted output, including the data structure, to the client device. The client system associated with the client device can receive the data and parse the data structure. Upon parsing the data structure, the client system can generate the corresponding graphical elements for display via the application interface. In some implementations, the client system can parse the data structure generated by the language model to retrieve and/or display hyperlinks, text data, thumbnail data, or other data associated with one or more application interfaces. In some implementations, the generated displayed interactive element can correspond to one or more target application interfaces, and can include any number of interactive elements, such as buttons, links, or other interactive elements. When a player interacts with an interactive element, the client device can navigate to the corresponding application interface. This may include automatically executing an embedded web browser, terminating the communication session, executing a second application that can provide the corresponding application interface, or transitioning to a second application interface of the application. Examples of a graphical element generated by the application based on formatting instructions/data structure information provided from the language model is shown in FIG. 8.

Figure 8:
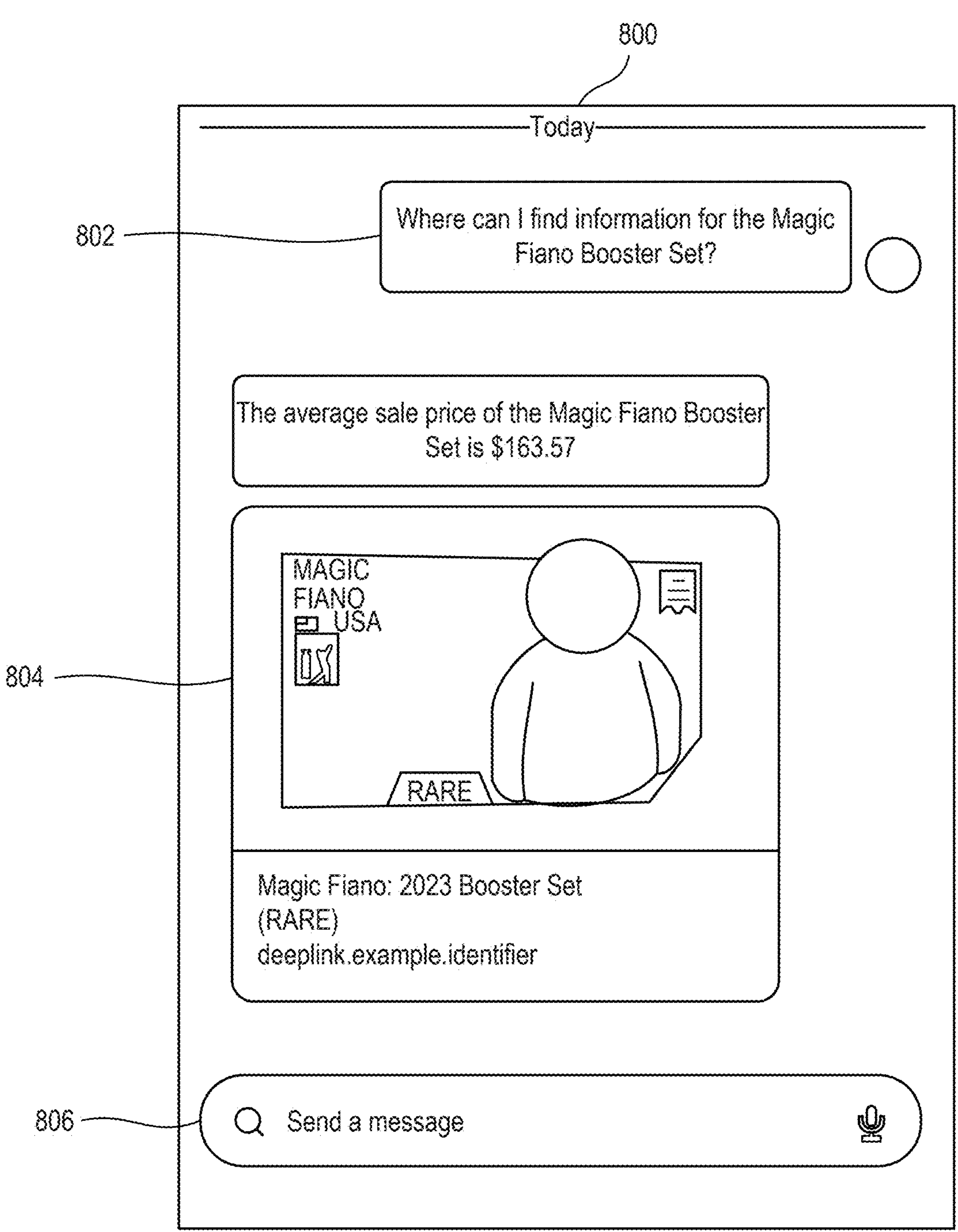
FIG. 8 illustrates an example implementation of an application interface in connection with FIG. 3, in accordance with one or more implementations.

Referring now to FIG. 8 in the context of the components described in connection with FIG. 1, depicted is an example implementation of an application interface, as described in connection with FIG. 3. A player can input a betting interest by interacting with a message bar 806, as described herein. A graphical user interface 800 can present the initial prompt 802 based on the player's interaction with the message bar 806. In this example, the prompt 802 reads "Where can I find information for the Magic Fiano Booster Set?", indicating a request for information relating to an application interface, which in this case may be an application interface providing information on "Magic Fiano Booster Set." The data processing system 105 can receive the prompt 802 and can classify the intent of the prompt according to the techniques described herein. The data processing system can generate an input context for the language model 190 based on the classification of the intent of the prompt 802, as described herein. Generating the input context may include searching one or more databases or repositories of application interfaces to identify the target application interface identified in or most relevant to the request. The input context can include identifiers of one or more application interfaces identified based on the prompt, as well as any metadata relating to the application interface.

The language model 190 can process the input context and generate data structures that can be processed into the presentation of the deep link 804 shown in FIG. 8. The data structure can include content identifiers, hyperlinks (e.g., URIs, URLs), deep links, or internal references to web pages or information resources that provide relevant information. The data structure can include formatting instructions, for example, specifying how the deep link 804 is to be displayed on the graphical user interface 800, such as layout, font size, and color. The data structure can incorporate interactive elements, providing information about any clickable or actionable elements within the deep link 804, such as buttons and links. In some implementations, the data structure can include metadata, which includes additional details about the deep link 804 such as title, description, or related items. The client system 115 can parse the data structure to generate the visual representation of the deep link 804 on the graphical user interface 800.

As shown, the deep link 804 can include text elements, such as "Magic Fiano: 2023 Booster Set (RARE)", and an associated URL. The graphical user interface 800 can show an additional natural language text output provided in the output of the language model 190, which in this example is "The average sale price of the Magic Fiano Booster Set is $163.57." In some implementations, in response to receiving the interaction with the URL, the client device can navigate to the application interface indicated in the deep link 804. In this example, the application interface can provide additional information about the Magic Fiano 2023 Booster Set. Although only one deep link 804 is returned based on the prompt 802, it should be understood that any number of deep links 804 may be provided via the output of the language model, which may be formatted in one or more lists of content within the graphical user interface 800.

Figure 4:
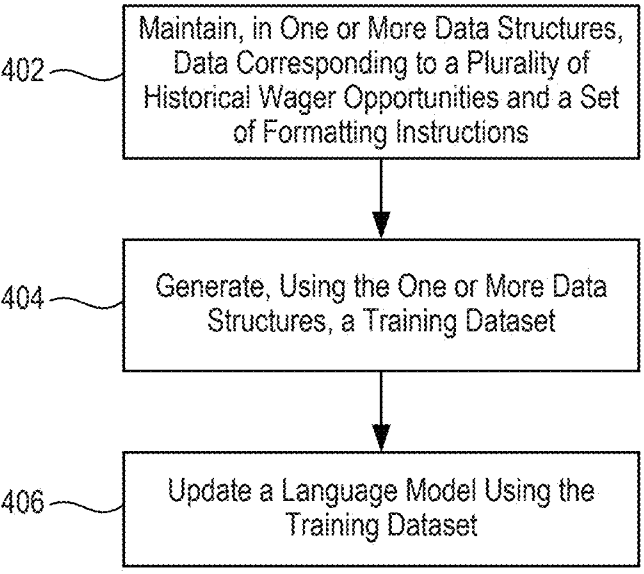
FIG. 4 illustrates an example flow diagram of a method for training language models to generate display instructions, in accordance with one or more implementations.

D. Systems and Methods for Training Language Models to Generate Display Instructions Referring now to FIG. 4, depicted is an illustrative flow diagram of a method 400 for training language models to generate display instructions. The method 400 can be executed, performed, or otherwise carried out by a data processing system. A data processing system (e.g., the data processing system 105) can be remote to one or more client systems (e.g., the client system 115) and one or more machine learning systems (e.g., the machine learning system 120) and can communicate with the one or more client systems or the one or more machine learning systems via a computer network (e.g., the network 110). In a brief overview of method 400, the interactive server or the system can maintain, in one or more data structures, data corresponding to a plurality of historical wager opportunities and a set of formatting instructions (STEP 402), generate, using the one or more data structures, a training dataset (STEP 404), and update a language model using the training dataset (STEP 406).

In further detail of method 400, the data processing system can maintain, in one or more data structures, data corresponding to a plurality of historical wager opportunities and a set of formatting instructions (STEP 402). The data processing system can maintain a storage of historical wager opportunities and associated formatting instructions. The storage, structured as a database or a collection of data structures, can be used for system operations. In some implementations, historical wager opportunities can refer to a record of past wager options that may have been provided via the data processing system. The historical wager opportunities can include a range of information including historical live event details (e.g., which can specify the particular sporting event, match, or competition associated with the wager), wager types (e.g., which can indicate different wagering options available for the event such as moneyline, point spread, parlay, etc.) odds (e.g., which can indicate the payout ratios for each wager option at different points in time), wager outcomes (e.g., which can indicate the final results of the event and the corresponding win/loss status for each wager type), and other relevant data (e.g., which can include additional information such as wager limits, wager popularity, or associated promotional activities), among others.

In some implementations, the data processing system can maintain wager opportunity records in storage. Each wager opportunity can be indicated by a structured record, including fields such as an identifier, live event details (sport, teams, date, time), wager type (moneyline, point spread, parlay, etc.), odds, wager limits, and other relevant attributes (e.g., player prop, team prop), among others. In some implementations, the data processing system can maintain formatting instructions, which can correspond to a specific wager opportunity. The data processing system can select the formatting instructions based on the type of wager opportunity. For example, based on the identified wager type, the data processing system can retrieve the corresponding formatting instructions from storage. The formatting instructions may be pre-generated based on wager type, wager details, or any other aspect of the wager. The formatting instructions can specify the visual presentation of wager information associated with the wager opportunity.

The data processing system can generate, using the one or more data structures, a training dataset (STEP 404). The data processing system can use the stored historical wager opportunity data and formatting instructions to generate a training dataset. The training dataset can include multiple training examples. Each training example can indicate an input message/context indicating at least one wager opportunity and an output message that is to be generated by the language model to generate formatting instructions for the wager opportunities (e.g., ground truth data for supervised learning). In some implementations, generating each training example can include generating an input context that includes relevant details about the wager opportunity (e.g., sport, teams, bet type, odds, etc.). In some implementations, the data processing system can generate the input context that requests a wager recommendation and the data of the wager opportunity selected based on the prompt. The wager recommendation can refer to a wager or betting option based on specific criteria or player preferences.

The output for each training example can be defined as an output message, which specifies the visual presentation of the wager opportunity. For example, the output can include display instructions for the wager opportunity generated according to formatting instructions. The display instructions can include layout specifications (text size, color, font, alignment), graphical elements (images, icons), interactive components (buttons, links), and formatting rules (e.g., highlighting updates or changes), among others. In some implementations, the input context may specify certain details for formatting the presentation of the wager opportunity, such that the language model is trained to generate customizable output layouts based on the input layout configuration data. The layout configuration data may specify various aspects of the presentation, including color scheme information, high-level positioning information, or other aspects that may be converted into structured data and/or display instructions that can be parsed by a client device to generate visual presentations of wager opportunities as described herein.

In some implementations, the data structures associated with wager opportunities can include deep links to other applications or functionalities of an application or the data processing system. Training examples to generate output formatting instructions for deep links can be integrated into the training dataset. In this example, the training dataset can include examples where the input context includes information about a specific deep link (e.g., the target URI/URL, associated content, or relevant metadata), and the corresponding output can include display instructions on how to display or present that deep link on the application interface. For example, the display instructions can include structured data that can be parsed to construct the visual representation of the link (e.g., text, button, icon), the placement of the link within the presentation, or any associated interactive behaviors (e.g., opening a new tab, in-app navigation), among others. In some implementations, the display instructions can include a network location identifier from which related information may be retrieved and displayed in connection with the deep link.

In some implementations, the data processing system can implement different data structures for storing wager opportunity data and formatting instructions, respectively. For example, a first data structure can include information about the wager opportunity, such as event details, bet type, odds, participants, and other relevant attributes, and a second data structure can include the visual presentation of the wager opportunity, specifying layout and design elements, textual content, graphical components, and interactive elements, among others. In some implementations, the data structures may include an indication that the data in the output corresponds to one of a deep link or a wager opportunity.

The data structure can update a language model using the training dataset (STEP 406). The data processing system can improve the accuracy and precision of the language model with respect to certain output information, and to enable the language model to generate data structures that indicate formatting for different wager opportunities and/or deep links. For example, the data processing system can provide the training examples of the training dataset as input to the language model, and use supervised learning approaches to update the trainable parameters of the language model. In some implementations, the language model may be trained/updated to generate one or more tokens that indicate the beginning of specific formatting instructions for wager opportunities and/or deep links, as described herein. For example, the token can function as a marker, indicating where the instructions for displaying the generated content start. In some implementations, the language model's internal structure can be updated based on the processed input and training data. For example, the data processing system can update the language model's parameters to better predict these tokens based on the input context.

Training the language model may include generating one or more adapters, such as LoRA or QLoRA adapters for a pre-trained language model. The adapters may be trained using similar training techniques to those described herein, and can be stored at the data processing system and/or the machine learning system (e.g., the machine learning system 120) and loaded into memory to process information relating to wager opportunities and/or deep link information. In some implementations, different adapters can be trained/generated for different types of prompts. For example, one set of adapters may be generated and dynamically used for prompts that indicate a request for wager and another set of adapters may be generated and dynamically used for prompts that indicate a request for one or more application interfaces.

E. Systems and Methods for Generating Content Items Using Language Models

Figure 5:
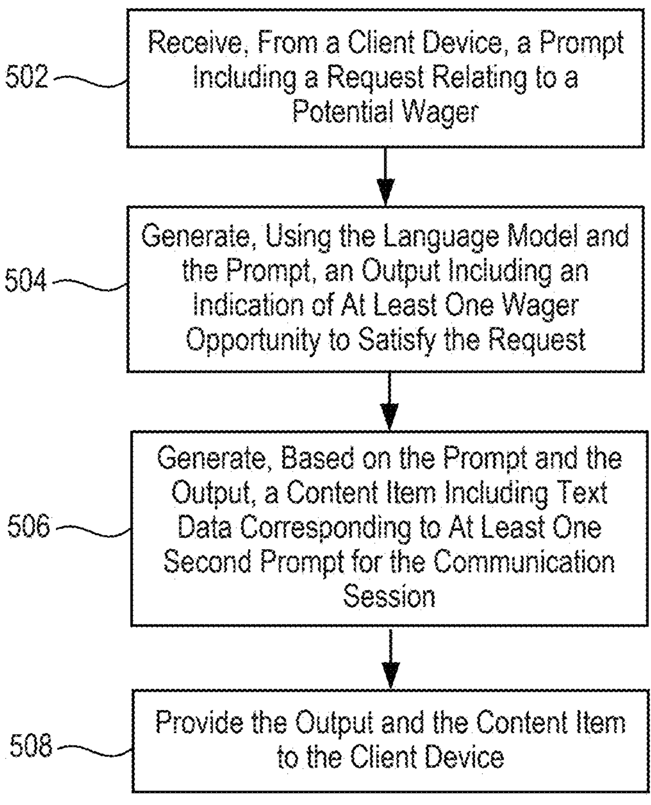
FIG. 5 illustrates an example flow diagram of a method for generating content items using language models, in accordance with one or more implementations.

Referring now to FIG. 5, depicted is an illustrative flow diagram of a method 500 for generating content items using language models. The method 500 can be executed, performed, or otherwise carried out by an interactive server or a system. A data processing system (e.g., the data processing system 105) can be remote to one or more client systems (e.g., the client system 115) and one or more machine learning systems (e.g., the machine learning system 120) and can communicate with the one or more client systems or the one or more machine learning systems via a computer network (e.g., the network 110). In a brief overview of method 500, the interactive server or the system can receive, from a client device, a prompt including a request relating to a potential wager (STEP 502), generate, using the language model and the prompt, an output including an indication of at least one wager opportunity to satisfy the request (STEP 504), generate, based on the prompt and the output, a content item including text data corresponding to at least one second prompt for the communication session (STEP 506), and provide the output and the content item to the client device (STEP 508).

In further detail of method 500, the data processing system can receive, from a client device, a prompt including a request relating to a potential wager (STEP 502). A prompt can include any player-provided command, request, or text data, such as natural language text data as described herein. The prompt can include a request or information relating to wager placement, such as an indication of a wager type, a wager amount, requests for information relating to one or application interfaces, live events, or prompts relating to one or more live events or outcomes. The data processing system can receive the prompt from the client system associated with the client device in natural language (e.g., a text string). The data processing system can receive prompts through player interactions with the application interface. Player interactions can include clicking buttons, entering text, or using voice commands within one or more application interfaces, among others. In some implementations, the data processing system can expose an API endpoint, allowing other applications or systems to send prompts in structured formats such as JavaScript Object Notation (JSON) or XML. In some implementations, the data processing system can identify specific events or triggers, such as player actions or system state changes, which can generate prompts.

The data processing system can generate, using the language model and the prompt, an output including an indication of at least one wager opportunity to satisfy the request (STEP 504). The prompt can specify desired sports, teams, or wager types. The data processing system can generate an input context for the language model based on the prompt. The language model can generate data structures corresponding to potential wager opportunities. The wager opportunities can include single wagers or parlays with one or multiple legs. The generated wager opportunities can include details such as sports, teams or participants, wager types, odds, and potential payout, among others. In some implementations, the data processing system can receive additional prompts. Based on the prompt, such as specifying a particular team or sport, the data processing system can generate additional wager opportunities using the language model.

In some implementations, the data processing system can generate an output message using the language model that may not necessarily include a wager recommendation. For example, depending on the classification of the intent of the prompt, the data processing system may determine that the prompt indicates a request for an application interface, a request for information that can be generated using the language model without necessarily accessing additional data, or any other type of request described herein. Using the techniques described herein, the data processing system can generate an input context for the language model based on the classified intent, including any additional information relating to the intent (e.g., data of wager opportunities, data corresponding to application interfaces, other external information, etc.). The data processing system can then provide the input context to the language model, which can produce an output message as described herein. The data processing system can store the input context, the prompt, and/or any additional information in the communication session (e.g., other input contexts, prompts, responses, etc.) to perform further operations as described herein.

The data processing system can generate, based on the prompt and the output, a content item including text data corresponding to at least one second prompt for the communication session (STEP 506). The content item may include or represent one or more suggested prompts that the player can provide to the language model and may be generated based on data provided by the client device and/or the language model during the communication session. The data processing system can generate the content item based on a received prompt (e.g., a first prompt in this example) and its generated output. The data processing system can generate one or more additional candidate prompts (e.g., second prompts or content items) configured to prompt further interaction. The content items can be derived from one or more prompts/input contexts and corresponding output(s) generated by the language model. In some implementations, the data processing system can generate the content items based on predefined templates or rules. The data processing system can use data structures to store and manage the additional candidate prompts, including metadata such as creation time, usage frequency, and performance metrics, among others. In some implementations, the data processing system can access one or more data structures, including information about various wager opportunities. Based on the first prompt and its corresponding output, the data processing system can generate content items to include relevant wager data associated with relevant wager opportunities.

Figure 9:
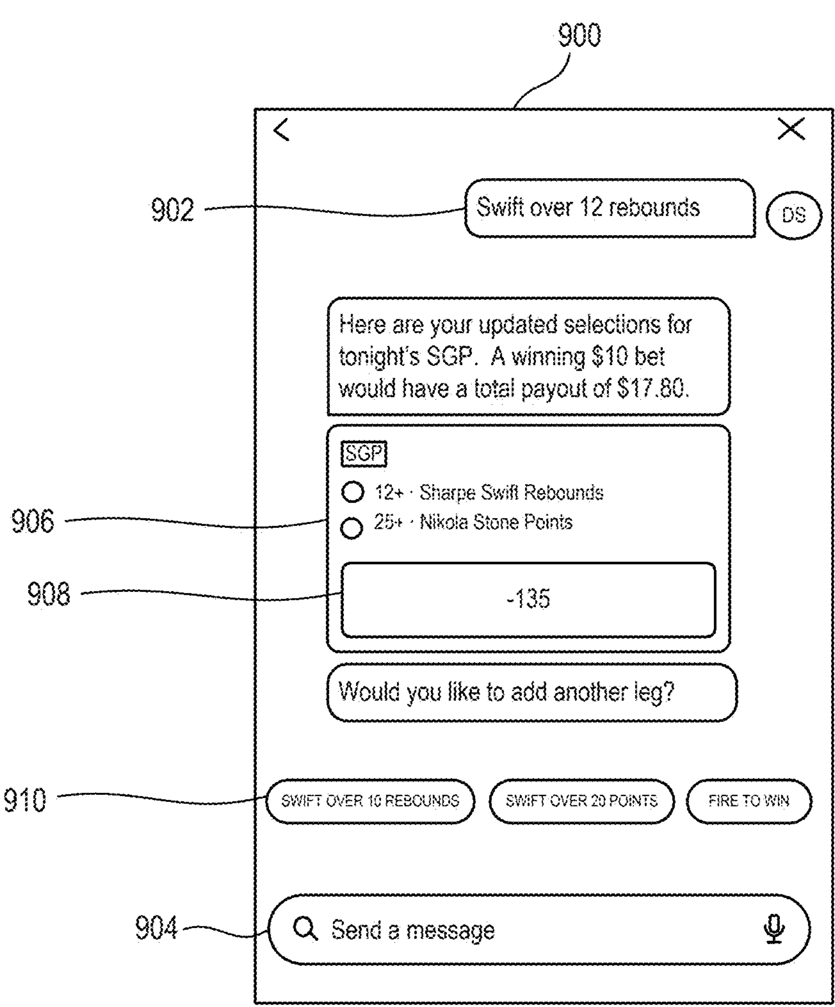
FIG. 9 illustrates an example implementation of an application interface in connection with FIG. 5, in accordance with one or more implementations.

For example, the text data for generating a content item may be derived from additional search results identified from the prompt (e.g., in a wager request) but not necessarily included in the input context for the language model. Text data from the search results, such as identifiers/text data of additional legs for parlay wagers, identifiers/text data of additional potentially relevant wagers, or other information may be identified based on the input prompt. Text data from any suitable source may be used to generate the content items, examples of which are shown in FIG. 9. In some implementations, named entity recognition techniques can be implemented by the data processing system to generate one or more content items, which may involve rule-based named entity extraction or named entity extraction using one or more machine learning models.

In some implementations, the data processing system can generate text content for the content item using relevant wager data associated with various wager opportunities identified based on the prompt and/or additional data described herein. The content item can be a candidate prompt to be provided to the language model and may be presented via one or more graphical user interfaces (e.g., the graphical user interface 900 of FIG. 9, etc.). In some implementations, the content can include key terms or textual content associated with the first prompt and its corresponding output. In some implementations, the data processing system can access relevant data from the player's profile, such as betting history, preferences, or demographics, which may be used as text data, metadata, or other content to generate one or more content items. In some implementations, the player profile can identify historical actions performed using the player profile, which may be accessed to generate one or more content items described herein. In some implementations, the content item can be formatted according to specific guidelines, such as character limits, style conventions, or platform requirements.

In some implementations, the data processing system can generate candidate prompts using one or more predefined templates or rules that can be populated with named entities or other information extracted from the communication session or retrieved from additional sources. These templates can be structured to include portions that are to be replaced with named entities and/or extracted data. The templates/rules used to generate the candidate prompts may include predetermined text data requesting additional information about one or more named entities that is to be populated, requesting an additional wager opportunity relating to one or more named entities that is to be populated, or requesting an additional wager related to one or more historical wagers to be populated, among others. For example, if the initial prompt was a request for information about a particular sports team, a candidate prompt generated by the data processing system might request one or more wagers on the team for one or more upcoming or current live events.

In some implementations, the data processing system can generate candidate prompts or content items using the language model or another machine-learning model. For example, the data processing system may generate one or more input contexts including data from the communication session, additional information from other information sources (e.g., the storage of the data processing system, etc.), and instructions to generate one or more candidate prompts as output. The instructions may indicate a character or word limit for the candidate prompt(s). The language model can generate one or more data structures that include text data for each content item based on the input context. The data structures can include text data for one or more content items and/or metadata corresponding to the one or more content items. In some implementations, the output data structure(s) generated using the language model can indicate one or more special characters, tokens, or other data that separates text data for each content item, and in some implementations specifying the number of content item(s) generated in the output data structure.

The data processing system can provide the output and the content item to the client device (STEP 508). The content item may be or include the text data generated using the one or more templates and/or extracted from the output data structure(s) of the language model. In some implementations, the content items can be provided in additional to response messages generated using the language model, such that the response messages can be displayed in connection with the content items. The content items can represent suggested prompts that may be submitted to the data processing system, and may be displayed separately from the output messages of the language model, as shown in connection with FIG. 9. The output can be generated directly by the data processing system based on the prompt. The output can be generated by the language model based on the input context generated by the data processing system. The data processing system can transmit the generated output to the client system, for example, through a network connection. The client system can parse the content of the output and present it to the client device via the application interface. In some implementations, the text data may be generated with display instructions, which may indicate layout information (e.g., order of content items, position of content items, number of content items, size of content items, etc.). The data processing system can transmit the content item data to the client The application interface for the communication session can display content items corresponding to suggested prompts as overlay elements. The content items can be positioned at the bottom of the interface or in other layout configurations. In some implementations, the application interface can incorporate rounded corners, borders, or other styling elements for the content items, which may be specified via configuration settings of the application and/or via display instructions provided by the data processing system (which may be generated at least in part based on output of the language mode as described herein, in some implementations). In some implementations, the content items can be displayed below the main content, to the side, or integrated within the main content as inline suggestions. In some implementations, the data processing system can update the player profile in response to receiving an interaction with the content items. An example presentation of content items with prompts and responses of a communication session are shown in FIG. 9.

Referring now to FIG. 9, depicted is an example implementation of an application interface, as described in connection with FIG. 5. As shown, a graphical user interface 900 can display a prompt 902 based on a player's interaction with a message bar 904. The prompt 902 can be an initial prompt/request entered by the player via the message bar 904. In this example, the prompt 902 reads "Swift over 12 rebounds", indicating the player's interest in placing a wager on Sharpe Swift exceeding 12 rebounds in an upcoming game.

The data processing system 105 can receive the prompt 902 from the client system 115 over the network 110. The data processing system 105 can determine the classification of the request included in the prompt field 902, such as identifying the desired wager type and relevant player or team, as described herein. The data processing system 105 can generate an input context for the language model 190 based on the classified intent and prompt. The language model can process the prompt field 902 and the input context to generate data structures corresponding to a specific wager. For example, the data structure can include information such as the wager type (e.g., SGP), participants, and relevant metrics, among others. In this example, the output generated by the language model provides a recommendation for an SGP wager identifying the participant (Swift Sharp) specified by the player.

The client system 115 can parse the data structure to extract specific wager options and the associated information. For example, upon parsing the data structure, the client system 115 can display a wager option, such as an SGP option 906, along with an additional output, such as "Here are your updated selections for tonight's SGP. A winning $10 bet would have a total payout of $17.80". The SGP 906 can include a pre-built parlay wager opportunity 160, which can be related to the initial prompt 902 and the input context generated based on the prompt field 902. The SGP option 906 is shown as including legs for Sharpe Swift scoring over 12 rebounds and Nickola Stone scoring over 25 points in that game. The SGP option 906 can display the odds 908, such as −135, associated with the parlay. The SGP option 906 can be an interactive element that, when interacted with, causes the data processing system 105 to update the player profile associated with the client system 115.

In some implementations, the data processing system 105 can cause the language model 190 to generate the data structures corresponding to content items 175 based on the prompt field 902 and the wager option, such as the SGP option 906. For example, the data processing system 105 can process the initial prompt field 902 (e.g., Swift over 12 rebounds) to extract elements such as the player's name (Swift) and the desired statistic (rebounds). Based on the extracted information, the data processing system 105 can generate candidate prompts 910 (also referred to as content items). The candidate prompts 910 can vary in style or value. As shown, the graphical user interface 900 can display the candidate prompts 910 as text bubbles (e.g., rounded or irregularly shaped outlines filled with text) positioned above the message bar 910 and below the SGP option 906. In some implementations, the candidate prompts 910 can be placed elsewhere on the graphical user interface 900 based on layout instructions.

As described herein, the data processing system can generate the candidate prompts 910 based on factors such as the player's interests, the initial prompt 902, and available wager opportunities, among others. In this example, the candidate prompts 910 are directed to rebounds with different statistical thresholds for the same player (e.g., Swift over 10 rebounds, Swift over 20 points). In some implementations, the data processing system can generate additional candidate prompts for opposing outcomes (e.g., Swift under 12 rebounds) or wagers on the opposing team. The candidate prompts 910 can be interactive elements. For example, a player can interact with the candidate prompts 910 by clicking or tapping. When the data processing system 105 receives an interaction with any of the candidate prompts 910, the data processing system 105 updates the player profile.

Although three candidate prompts are shown in the graphical user interface 900, any number of candidate prompts may be provided in response to one or more prompts. Swipe or scroll interactions can be provided to navigate through one or more lists of candidate items. In this example, a left swipe on the region of the graphical user interface 900 showing the row of candidate prompts 910 may scroll through a list of candidate prompts. In some implementations, a button to provide additional candidate prompts may be displayed, which when interacted with, can cause the client device to transmit a request to the data processing system to provide additional and/or replacement candidate prompts. In some implementations, candidate prompts/content items can be displayed prior to the submission of one or more prompts. In such implementations, the candidate prompts may be generated based on player profile information, including but not limited to historical wagers, currently available and/or relevant wager opportunities, or any other information described herein.

Figure 6:
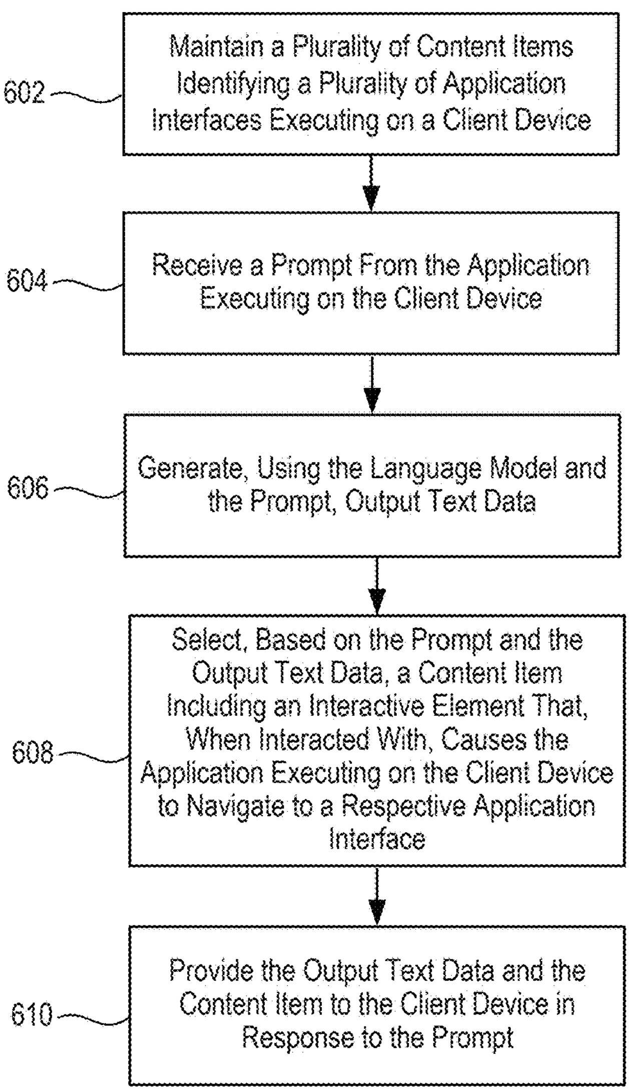
FIG. 6 illustrates an example flow diagram of a method for selecting additional content based on conversational data, in accordance with one or more implementations.

F. Systems and Methods for Selecting Additional Content Based on Conversational Data Referring now to FIG. 6, depicted is an illustrative flow diagram of a method 600 for selecting additional content based on conversational data. The method 600 can be executed, performed, or otherwise carried out by an interactive server or a system. A data processing system (e.g., the data processing system 105) can be remote to one or more client systems (e.g., the client system 115) and one or more machine learning systems (e.g., the machine learning system 120) and can communicate with the one or more client systems or the one or more machine learning systems via a computer network (e.g., the network 110). In a brief overview of method 600, the interactive server or the system can maintain a plurality of content items identifying a plurality of application interfaces executing on a client device (STEP 602), receive a prompt from the application executing on the client device (STEP 604), generate, using the language model and the prompt, output text data (STEP 606), select, based on the prompt and the output text data, a content item including an interactive element that, when interacted with, causes the application executing on the client device to navigate to a respective application interface (STEP 608), and provide the output text data and the content item to the client device in response to the prompt (STEP 610).

In further detail of method 600, the data processing system can maintain a plurality of content items identifying a plurality of application interfaces executing on a client device (STEP 602). The content item can be any digital content that can include different content formats, including media (e.g., images, video, application data) and/or interactive elements. The content item can be a visual or graphical element used within the application. For example, the content item can include an image, such as a preview, an icon, or other visual representations associated with specific application interfaces. The content item can include an interactive element, which can be a button, link, or any clickable component. When a player interacts with the interactive elements (e.g., select, click-on, touch, hover), the interaction can trigger navigation within the application running on the client system.

In some implementations, a content item can provide attributes for the corresponding application interface. The content item can include an event identifier (ID), which can be an identifier for a specific event within the application. An event can be referred to as any sporting or competitive activity that functions as the basis for wagering. In some implementations, an event may refer to any video or broadcast stream for which wagers can be provided. In some implementations, events can refer to specific moments within a live sporting event upon which wagers can be placed (e.g., events for which live betting can occur). The event can include specific sporting events, tournaments, brackets, or any other activity or outcome on which wager(s) can be placed, including but not limited to individual contests between teams or players. The event can include entire competitions with multiple live events.

The data processing system can receive a prompt from the application executing on the client device (STEP 604). The data processing system can receive the prompt during a communication session, as described herein. A prompt can include any player-provided command, request, or text data. The prompt can include a request or information relating to wager placement, such as an indication of a wager type, a wager amount, or selecting specific live events or outcomes. A communication session can be initiated when a player accesses the application and concluded upon logout or application closure. Each session can be identified and tracked. In some implementations, a communication session can be indicated by a series of prompts and responses exchanged between the player and the data processing system. For example, upon a player interaction with an interactive element presented by an application, such as clicking a button or entering text, a prompt can be generated and added to the conversation record associated with the session. The data processing system can process the prompt and generate a corresponding response, which can be appended to the conversation record.

The data processing system can generate, using the language model and the prompt, output text data (STEP 606). The output text data may be generated by generating an input context for a language model, as described herein. The output text data can be a sequence of characters that correspond to text-based information. In some implementations, the output text data can be a digital representation of textual information that can be stored, processed, and transmitted. The output text data can be structured, such as in JSON or XML formats, or unstructured, such as in plain text or natural language. For example, if the prompt is "Show me the odds for Team A to win their next game", the output text data can display the betting odds for one or more relevant wager opportunities, as described herein.

The data processing system can select, based on the prompt and the output text data, a content item including an interactive element that, when interacted with, causes the application executing on the client device to navigate to a respective application interface (STEP 608). The content item can include an interactive element. The interactive element can initiate a specific action when interacted with. The interactive elements can be a button, link, image, or any other player interface component that prompts player interaction. For example, when a player interacts with the content item (e.g., a button click), the data processing system can receive an indication of an interaction with the content item. Upon receiving the indication, the data processing system can cause the application running on the client device to navigate to a designated application interface.

In some implementations, the data processing system can extract relevant information from the prompt and output text data. The extracted information can include keywords, entities, or other graphical elements. Using this information, the data processing system can select content items identified as relevant to the information provided during the communication session. In some implementations, based on the extracted information, the data processing system can calculate similarity scores for each content item in its storage relative to data within (or that is to be provided as part of) the communication session, which may include any input prompt(s) and/or language model output. These similarity scores quantify how closely a particular content item aligns with the identified keywords, entities, or graphical elements extracted and/or identified from the communication session data. Any suitable technique may be used to generate the similarity scores, including but not limited such as cosine similarity, Jaccard index, or TF-IDF (Term Frequency-Inverse Document Frequency). Similarity can be calculated between the communication session data and data (e.g., text data, image data, etc.) and/or metadata (e.g., category, etc.) of each content item maintained by the data processing system.

The data processing system can use the similarity scores to determine which content item to present with the output of the language model. In some implementations, the data processing system can compare the calculated similarity scores and select the content item(s) with the highest overall score. In such implementations, content items that have the closest semantic relationship to both the user's input prompt and the language model's generated text can be selected for presentation at the client device during the communication session. In some implementations, the similarity scores can be calculated based on only one or the input prompt(s) or the output of the language model. The selected content item may contain an interactive element, such as a button or link, which, when interacted with by the user, can trigger navigation to a designated application interface associated with the selected content item. An identifier of the application interface and/or instructions to navigate to the selected content item may be provided as part of the content item.

In some implementations, the data processing system can select one or more content items further based on additional information, including the characteristics of the target application interface and the player's past interactions indicated in the player profile used to access the communication session. For example, if the player has previously interacted with content related to a specific topic, the data processing system may favor content items that build upon those prior experiences. In another example, if the player has a history of placing wagers that are relevant to one or more concepts/entities represented in the data of the communication session, the data processing system can prioritize content items relating to those concepts/entities.

In some implementations, the data processing system can calculate similarity scores for content items using a weighted sum approach. In doing so, the data processing system can calculate one or more similarity scores using the communication session data (including input prompts and language model output), various data within the player profile, and other information maintained by the data processing system. Each item of data can be assigned a weight reflecting its relative significance in determining content relevance. In some implementations, the weights can be predetermined values maintained by the data processing system. In some implementations, the data processing system can determine weight values based on factors such as the type of data, historical engagement metrics, and other historical data. The data processing system can calculate the weighted sum similarity score by multiplying each data item's similarity score with its corresponding weight and then summing these products to generate an overall similarity score for a given content item. Various data within the player profile can be used to calculate the weighted similarity score. Such data can include but is not limited to past interactions (e.g., viewed content, clicked links, placed wagers, prior communication session data, etc.), preference data (e.g., relevant content categories, wager types, etc.), demographic information (e.g., age, location, language), or any other data described herein.

In some implementations, the data processing system can generate an additional content item using the language model. In some implementations, the language model can generate or augment content with the selected content item. In some implementations, the language model can generate additional text content based on the existing content, the prompt, or other relevant data. In some implementations, the language model can generate image descriptions or image data, which can be converted into visual representations via the client system. In some implementations, the data processing system can generate a portion of the content item using the language model and the respective application interface identified in the content item. In some implementations, the data processing system can generate a portion of the content item using the language model and the output text data. In some implementations, the language model can generate additional text, expand existing text, or modify the tone and style of the text based on the provided input context. In some implementations, the language model can generate text content that aligns with the application's style and design principles.

In some implementations, the data processing system can select the content item based on the player profile data. For example, the data processing system can extract relevant data points from the player profile. The data points can include demographics, preferences, behavior, or interaction history. In some implementations, the data processing system can select a content item based on additional search criteria. For example, the data processing system can extract content items from storage based on the search criteria. In some implementations, the data processing system can rank the extracted content items based on their relevance to the search prompt, such as keyword matching, semantic similarity, and other ranking algorithms. In some implementations, the data processing system can select the content item using a searching function, the prompt, and the output text data. In some implementations, the data processing system can select the content item using one or more portions of the prompt and the output text data.

In some implementations, the data processing system can maintain a storage of contests associated with one or more live events. Each contest can be associated with a corresponding content item configured for player interaction. When the data processing system receives a prompt, the data processing system can generate corresponding text data using the language model. Based on the prompt and its generated output, the data processing system can select a specific contest-related content item. In some implementations, when a player engages in a conversation with the data processing system via the application interface, the data processing system can process the conversation to identify relevant keywords or player intents related to potential contests. The data processing system can extract a set of potential content items associated with the identified contests. The selected content item can include an interactive element that a player can interact with. In response to receiving an interaction with the interactive element within the selected content item, the application can send a request, via the client system, to the data processing system. The request can specify the contest that corresponds to the interactive content item.

The data processing system can provide the output text data and the content item to the client device in response to the prompt (STEP 610). The data processing system can transmit the generated output to the client system, for example, through a network connection. In some implementations, the data processing system can transmit specific contests that correspond to one or more live events to the client system. The client system can parse the content of the output and present it to the client device via the application interface. The application interface can include graphical user interfaces or graphical elements that present content items, interaction modes, or wager recommendations. In some implementations, the application interface can display content items corresponding to suggested banners as overlay elements. For example, the content item can be a visually distinct graphical element displayed within an application interface. In this example, the content item can be associated with specific content, actions, or application interfaces. The content item can include text, image(s), other media, or combinations thereof. The content items can be positioned at the top, bottom, or sides of the interface. In some implementations, the application interface can incorporate rounded corners, borders, or other styling elements for the content items. In some implementations, the content items can be displayed as full-screen overlays, pop-ups, or integrated within the main content. In some implementations, the data processing system can update the player profile in response to receiving an interaction with the content items. In some implementations, the content items may be displayed according to layout/display instructions generated by the data processing system as described herein.

Figure 10:
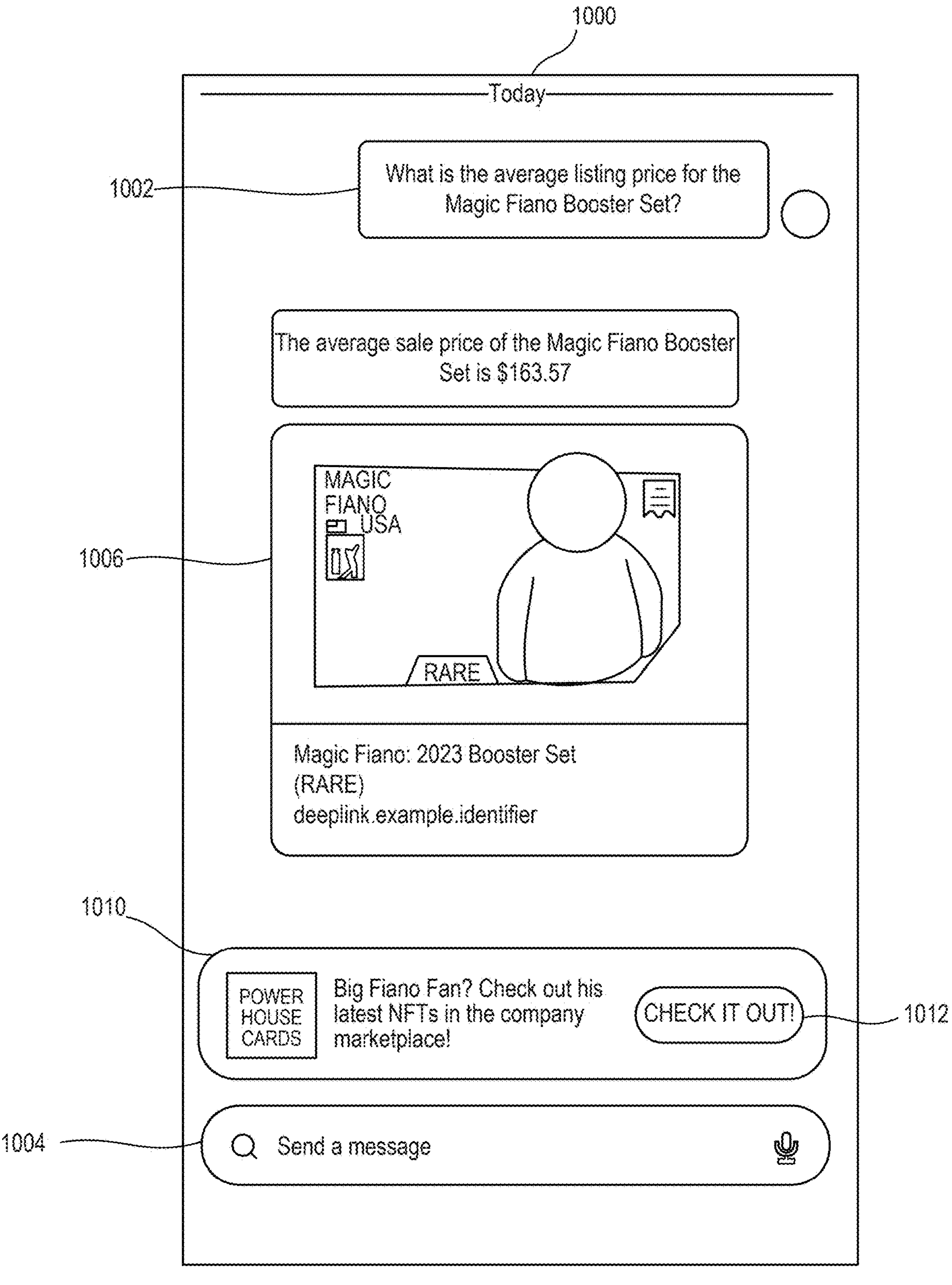
FIG. 10 illustrates an example implementation of an application interface in connection with FIG. 6, in accordance with one or more implementations.

Referring now to FIG. 10, depicted is an example implementation of an application interface, as described in connection with FIG. 6. As shown, a graphical user interface 1000 can display a prompt field 1002 based on a player's interaction with a message bar 1004. The prompt 1002 can be an initial prompt or search term entered by the player via the message bar 1004. In this example, the prompt 1002 reads "What is the average listing price for the Magic Fiano Booster Set?", indicating the player's interest in placing a wager on the price of the Magic Fiano Booster Set. The data processing system 105 can receive the player's prompt and process the prompt 1002 to extract relevant information. The data processing system 105 can generate an input context for the language model 190 based on the prompt field 1002. The input context can include data as described herein, including any relevant deep links and/or application interface identifiers to generate output as described herein.

As shown, the deep link 1006 can be similar to the deep link 804 described in connection with FIG. 8, and can include text elements, such as "Magic Fiano: 2023 Booster Set (RARE)", and an associated identifier. The graphical user interface 1000 can show an additional output, such as "The average sale price of the Magic Fiano Booster Set is $163.57", along with the deep link 1006. In some implementations, in response to receiving the interaction with the URL, the data processing system 105 can launch a web browser within the client device or open a new tab within the application to a new web page hosted on the indicated marketplace. In this example, the web page can provide additional information about the Magic Fiano 2023 Booster Set.

In some implementations, the data processing system 105 can process the initial prompt field 1002 to extract key elements such as player names, events, or desired actions. The data processing system 105 can cause the language model to generate data structures corresponding to the extracted information. In some implementations, the client system 115 can parse the data structures and select a banner 1010 (also referred to as the content items 175). The banner 1010 can include textual content, visual elements, and interactive elements, among others. In some implementations, the data processing system 105 can determine the placement of the banner 1010 within the graphical user interface 1000 based on factors such as screen size, content layout, and/or instructions generated by the data processing system as described herein. In some implementations, the banner 1010 can include data specifying one or more of a color scheme, typography, or other style information. In some implementations, the banner 1010 can be placed elsewhere on the graphical user interface 1000 based on settings of the application and/or layout/display instructions provided by the data processing system.

In some implementations, the banner 1010 can include various elements. For example, the banner 1010 can include a headline, such as "Big Fiano Fan? Check out his latest NFTs in the company marketplace!", which may be included as part of a pre-generated content item and/or generated based on the prompt 1002, information of the deep link 1006, and/or information from the model response. In some implementations, the banner 1010 can include a visual element that supports the headline. In this example, the visual element corresponds to "POWERHOUSE CARDS", which can be displayed within the banner 1010. In some implementations, the banner 1010 can include a button 1012, such as "CHECK IT OUT!". The button 1012 can be an interactive element that a player can interact with, for example, by clicking or tapping. When the data processing system 105 receives an interaction with the button 1012, the application can navigate to another application interface associated with the banner 1010, or perform any other actions associated with the banner 1010.

G. Computing and Network Environment

Figure 11:
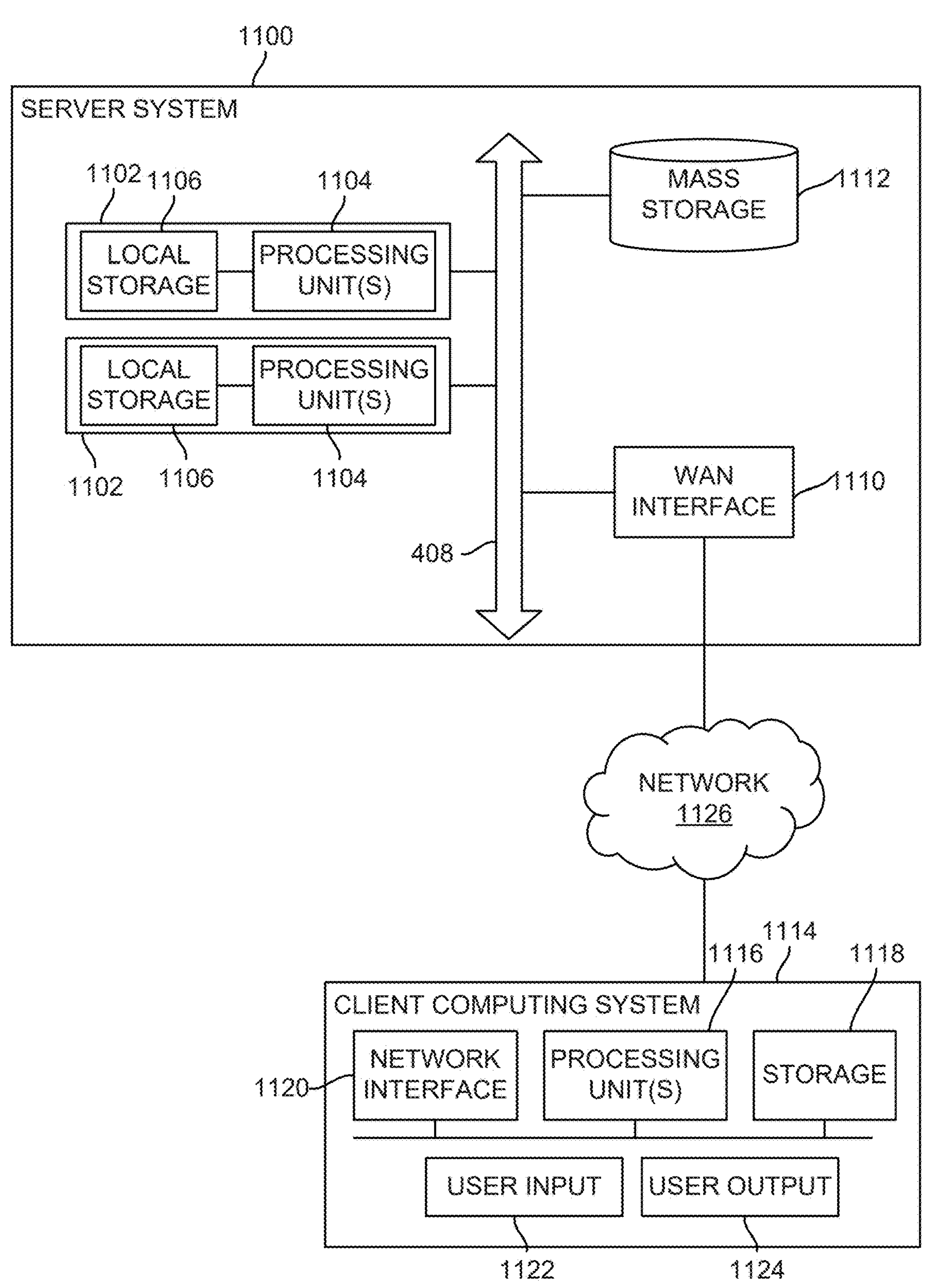
FIG. 11 illustrates a block diagram of a server system and a client computer system in accordance with an illustrative implementation.

Various operations described herein can be implemented on computer systems. FIG. 11 shows a simplified block diagram of a representative server system 1100, client computer system 1114, and network 1126 usable to implement certain implementations of the present disclosure. In various implementations, server system 1100 or similar systems can implement services or servers described herein or portions thereof. Client computer system 1114 or similar systems can implement clients described herein. The system (e.g., the data processing system 105) and others described herein can be similar to the server system 1100.

Server system 1100 can have a modular design that incorporates a number of modules 1102; while two modules 1102 are shown, any number can be provided. Each module 1102 can include processing unit(s) 1104 and local storage 1106.

Processing unit(s) 1104 can include a single processor, which can have one or more cores, or multiple processors. In some implementations, processing unit(s) 1104 can include a general-purpose primary processor as well as one or more special-purpose co-processors such as graphics processors, digital signal processors, or the like. In some implementations, some or all processing units 1104 can be implemented using customized circuits, such as application specific integrated circuits (ASICs) or field programmable gate arrays (FPGAs). In some implementations, such integrated circuits execute instructions that are stored on the circuit itself. In other implementations, processing unit(s) 1104 can execute instructions stored in local storage 1106. Any type of processors in any combination can be included in processing unit(s) 1104.

Local storage 1106 can include volatile storage media (e.g., DRAM, SRAM, SDRAM, or the like) and/or non-volatile storage media (e.g., magnetic or optical disk, flash memory, or the like). Storage media incorporated in local storage 1106 can be fixed, removable or upgradeable as desired. Local storage 1106 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 1104 need at runtime. The ROM can store static data and instructions that are needed by processing unit(s) 1104. The permanent storage device can be a non-volatile read-and-write memory device that can store instructions and data even when module 1102 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some implementations, local storage 1106 can store one or more software programs to be executed by processing unit(s) 1104, such as an operating system and/or programs implementing various server functions such as functions of the data processing systems 105 of FIG. 1 or any other system described herein, or any other server(s) associated with the data processing systems 105, or any other system described herein.

"Software" refers generally to sequences of instructions that, when executed by processing unit(s) 1104 cause server system 1100 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 1104. Software can be implemented as a single program or a collection of separate programs or program modules that interact as desired. From local storage 1106 (or non-local storage described below), processing unit(s) 1104 can retrieve program instructions to execute and data to process in order to execute various operations described above.

In some server systems 1100, multiple modules 1102 can be interconnected via a bus or other interconnect 1108, forming a local area network that supports communication between modules 1102 and other components of server system 1100. Interconnect 1108 can be implemented using various technologies including server racks, hubs, routers, etc.

A wide area network (WAN) interface 1110 can provide data communication capability between the local area network (interconnect 1108) and the network 1126, such as the Internet. Technologies can be used, including wired (e.g., Ethernet, IEEE 802.3 standards) and/or wireless technologies (e.g., Wi-Fi, IEEE 802.11 standards).

In some implementations, local storage 1106 is intended to provide working memory for processing unit(s) 1104, providing fast access to programs and/or data to be processed while reducing traffic on interconnect 1108. Storage for larger quantities of data can be provided on the local area network by one or more mass storage subsystems 1112 that can be connected to interconnect 1108. Mass storage subsystem 1112 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 1112. In some implementations, additional data storage resources may be accessible via WAN interface 1110 (potentially with increased latency).

Server system 1100 can operate in response to requests received via WAN interface 1110. For example, one of modules 1102 can implement a supervisory function and assign discrete tasks to other modules 1102 in response to received requests. Work allocation techniques can be used. As requests are processed, results can be returned to the requester via WAN interface 1110. Such operation can generally be automated. Further, in some implementations, WAN interface 1110 can connect multiple server systems 1100 to each other, providing scalable systems capable of managing high volumes of activity. Techniques for managing server systems and server farms (collections of server systems that cooperate) can be used, including dynamic resource allocation and reallocation.

Server system 1100 can interact with various user-owned or user-operated devices via a wide-area network such as the Internet. An example of a user-operated device is shown in FIG. 11 as client computing system 1114. Client computing system 1114 can be implemented, for example, as a consumer device such as a smartphone, other mobile phone, tablet computer, wearable computing device (e.g., smart watch, eyeglasses), desktop computer, laptop computer, and so on.

For example, client computing system 1114 can communicate via WAN interface 1110. Client computing system 1114 can include computer components such as processing unit(s) 1116, storage device 1118, network interface 1120, user input device 1122, and user output device 424. Client computing system 1114 can be a computing device implemented in a variety of form factors, such as a desktop computer, laptop computer, tablet computer, smartphone, other mobile computing device, wearable computing device, or the like.

Processor 1116 and storage device 1118 can be similar to processing unit(s) 1104 and local storage 1106 described above. Suitable devices can be selected based on the demands to be placed on client computing system 1114; for example, client computing system 1114 can be implemented as a "thin" client with limited processing capability or as a high-powered computing device. Client computing system 1114 can be provisioned with program code executable by processing unit(s) 1116 to enable various interactions with server system 1100 of a message management service such as accessing messages, performing actions on messages, and other interactions described above. Some client computing systems 1114 can also interact with a messaging service independently of the message management service.

Network interface 1120 can provide a connection to the network 1126, such as a wide area network (e.g., the Internet) to which WAN interface 1110 of server system 1100 is also connected. In various implementations, network interface 1120 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 1122 can include any device (or devices) via which a user can provide signals to client computing system 1114; client computing system 1114 can interpret the signals as indicative of particular user requests or information. In various implementations, user input device 1122 can include any or all of a keyboard, touch pad, touch screen, mouse or other pointing device, scroll wheel, click wheel, dial, button, switch, keypad, microphone, and so on.

User output device 1124 can include any device via which client computing system 1114 can provide information to a user. For example, user output device 1124 can include a display to display images generated by or delivered to client computing system 1114. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some implementations can include a device such as a touchscreen that function as both input and output device. In some implementations, other user output devices 1124 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 1104 and 1116 can provide various functionality for server system 1100 and client computing system 1114, including any of the functionality described herein as being performed by a server or client, or other functionality associated with message management services.

It will be appreciated that server system 1100 and client computing system 1114 are illustrative and that variations and modifications are possible. Computer systems used in connection with implementations of the present disclosure can have other capabilities not specifically described here. Further, while server system 1100 and client computing system 1114 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of these. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of these. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a player, implementations of the subject matter described in this specification can be implemented on a computer having a display device, e.g., a CRT (cathode ray tube), plasma, or LCD (liquid crystal display) monitor, for displaying information to the player and a keyboard and a pointing device, e.g., a mouse or a trackball, by which the player can provide input to the computer. Other kinds of devices can be used to provide for interaction with a player as well; for example, feedback provided to the player can include any form of sensory feedback, e.g., visual feedback, auditory feedback, or tactile feedback; and input from the player can be received in any form, including acoustic, speech, or tactile input. In addition, a computer can interact with a player by sending documents to and receiving documents from a device that is used by the player; for example, by sending web pages to a web browser on a player's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a player can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the system described herein can include clients and servers. For example, the system can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a player interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the system could be a single module, a logic device having one or more processing modules, one or more servers, or part of a search engine.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, elements, or acts of the systems and methods herein referred to in the singular may also embrace implementations including a plurality of these elements; and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for providing a system, the systems and methods described herein may be applied to other environments. The foregoing implementations are illustrative, rather than limiting, of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:

one or more processors coupled to non-transitory memory, the one or more processors configured to:

receive, from an application executing on the client device, during a communication session, a first prompt for a language model comprising a request for information corresponding to the application;

identify, using the first prompt, an identifier of a first application interface of the plurality of application interfaces of the application to satisfy the request for information;

generate, using the language model, the first prompt, and the identifier, output comprising a data structure corresponding to formatting of a graphical element that, when interacted with, causes navigation to the first application interface;

provide the output to the client device in response to the request, causing the client device to parse the data structure and generate the graphical element for display in a graphical user interface;

receive, from the client device, a second prompt indicating a request to update at least one wager recommendation;

generate, using the language model, the second prompt, and the data structure, second output comprising a second data structure corresponding to formatting of a second graphical element for the at least one wager recommendation; and provide the second output to the client device, causing the client device to parse the second data structure and generate the second graphical element for display in the graphical user interface.

2. The system of claim 1, wherein the data structure comprises data extracted from the first application interface.

3. The system of claim 1, wherein the prompt is a first prompt, and wherein the one or more processors are further configured to:

determine that at least one application interface cannot be identified based on the first prompt; and provide an indication to the client device that the at least one application interface cannot be identified.

4. The system of claim 3, wherein the one or more processors are further configured to:

receive a second prompt from the client device; and identify, using the first prompt and the second prompt, the identifier of the first application interface.

5. The system of claim 1, wherein the client device is associated with a player profile, and wherein the data structure comprises instructions to generate an interactive element that, when interacted with, causes the client device to transmit a request to update the player profile based on the at least one wager recommendation.

6. The system of claim 1, wherein the one or more processors are further configured to generate the data structure to include an indication that the at least one wager recommendation corresponds to a parlay wager.

7. The system of claim 1, wherein the one or more processors are further configured to:

determine a number of wagers placed based on the at least one wager recommendation; and update the data structure to include an indication of the number of wagers placed.

8. The system of claim 1, wherein the one or more processors are further configured to:

receive, from the client device, in response to an interaction with the graphical element, a request to place a wager corresponding to the at least one wager recommendation; and update a player profile associated with the client device according to the wager.

9. The system of claim 1, wherein the prompt is a first prompt, wherein the one or more processors are further configured to:

receive a second prompt identifying a request for a payout for the at least one wager recommendation; and generate, using the language model, the second prompt, and the data structure, second output comprising an indication of the payout for the at least one wager recommendation.

10. The system of claim 1, wherein the one or more processors are further configured to:

receive an update to odds for the at least one wager recommendation;

update the data structure to include an indication of the update; and provide the updated data structure to the client device.

11. A method, comprising:

receiving, by one or more processors coupled to non-transitory memory, from an application executing on the client device, during a communication session, a first prompt for a language model comprising a request for information corresponding to the application;

identifying, by the one or more processors, using the first prompt, an identifier of a first application interface of the plurality of application interfaces of the application to satisfy the request for information;

generating, by the one or more processors, using the language model, the first prompt, and the identifier, output comprising a data structure corresponding to formatting of a graphical element that, when interacted with, causes navigation to the first application interface;

providing, by the one or more processors, the output to the client device in response to the request, causing the client device to parse the data structure and generate the graphical element for display in a graphical user interface;

receiving, by the one or more processors, from the client device, a second prompt indicating a request to update the at least one wager recommendation;

generating, by the one or more processors, using the language model, the second prompt, and the data structure, second output comprising a second data structure corresponding to formatting of a second graphical element for the at least one wager recommendation; and providing, by the one or more processors, the second output to the client device, causing the client device to parse the second data structure and generate the second graphical element for display in the graphical user interface.

12. The method of claim 11, wherein the data structure comprises data extracted from the first application interface.

13. The method of claim 11, wherein the prompt is a first prompt, and further comprising:

determining, by the one or more processors, that at least one application interface cannot be identified based on the first prompt; and providing, by the one or more processors, an indication to the client device that the at least one application interface cannot be identified.

14. The method of claim 13, further comprising:

receiving, by the one or more processors, a second prompt from the client device; and identifying, by the one or more processors, using the first prompt and the second prompt, the identifier of the first application interface.

15. The method of claim 11, wherein the client device is associated with a player profile, and wherein the data structure comprises instructions to generate an interactive element that, when interacted with, causes the client device to transmit a request to update the player profile based on the at least one wager recommendation.

16. The method of claim 11, further comprising generating, by the one or more processors, the data structure to include an indication that the at least one wager recommendation corresponds to a parlay wager.

17. The method of claim 11, further comprising:

determining, by the one or more processors, a number of wagers placed based on the at least one wager recommendation; and updating, by the one or more processors, the data structure to include an indication of the number of wagers placed.

18. The method of claim 11, further comprising:

receiving, by the one or more processors, from the client device, in response to an interaction with the graphical element, a request to place a wager corresponding to the at least one wager recommendation; and updating, by the one or more processors, a player profile associated with the client device according to the wager.

* * * * *